United States Patent
Tomobe et al.

(10) Patent No.: US 8,489,332 B2
(45) Date of Patent: Jul. 16, 2013

(54) CAR NAVIGATION SYSTEM, PROGRAM AND METHOD FOR UPDATING MAP DATA

(75) Inventors: Osamu Tomobe, Mito (JP); Yukihiro Kawamata, Hitachi (JP); Hiroto Sasaki, Hitachi (JP); Takayuki Uchida, Yokohama (JP); Tetsumori Aikawa, Machida (JP)

(73) Assignee: Clarion Co., Ltd., Tokyo (JP)

( * ) Notice: Subject to any disclaimer, the term of this patent is extended or adjusted under 35 U.S.C. 154(b) by 426 days.

(21) Appl. No.: 12/823,670

(22) Filed: Jun. 25, 2010

(65) Prior Publication Data

US 2010/0332120 A1 Dec. 30, 2010

(30) Foreign Application Priority Data

Jun. 26, 2009 (JP) ................................. 2009-151997

(51) Int. Cl.
*G01C 21/36* (2006.01)

(52) U.S. Cl.
USPC ........... 701/533; 701/410; 701/446; 701/438; 701/532; 701/430

(58) Field of Classification Search
USPC .................. 701/410, 446, 438, 532, 430, 533
See application file for complete search history.

(56) References Cited

U.S. PATENT DOCUMENTS

| | | | | |
|---|---|---|---|---|
| 6,230,098 B1* | 5/2001 | Ando et al. | ................... | 701/410 |
| 7,024,307 B2* | 4/2006 | Ito et al. | ..................... | 701/446 |
| 7,082,443 B1* | 7/2006 | Ashby | ...................... | 342/357.41 |
| 7,099,882 B2* | 8/2006 | McDonough | ................ | 340/990 |
| 7,239,963 B2* | 7/2007 | Suzuki | ........................... | 701/438 |
| 7,403,852 B2* | 7/2008 | Mikuriya et al. | .............. | 701/532 |
| 7,584,049 B2* | 9/2009 | Nomura | ....................... | 701/425 |
| 7,680,593 B2* | 3/2010 | Fujimoto | ....................... | 701/451 |
| 8,055,620 B2* | 11/2011 | Nakamura et al. | ............ | 707/638 |
| 8,055,621 B2* | 11/2011 | Nakamura et al. | ............ | 707/638 |

FOREIGN PATENT DOCUMENTS

| JP | 11-95657 A | 4/1999 |
|---|---|---|
| JP | 2003-315056 A | 11/2003 |

* cited by examiner

*Primary Examiner* — Thomas Black
*Assistant Examiner* — Wae Louie
(74) *Attorney, Agent, or Firm* — Crowell & Moring LLP

(57) ABSTRACT

A car navigation system 1 includes a HDD map 110 and a cached map 109. Map data for entire area is stored in the HDD, and map data used by a route search unit 115 and a guidance unit 116 are stored in the cached map 109. A cached map area specifying unit 108 specifies map data files that should be stored in the cached map 109 for each navigation application, and stores the names of the specified map data files, linked to the respective navigation applications, into a navigation application consistency management table 103. A consistency judgment unit 104 monitors an update status of a data file of which name stored in the navigation application consistency management table 103, and stores the update status (completed or not completed) into the navigation application consistency management table 103.

11 Claims, 20 Drawing Sheets

FIG.6

```
<parcel ID>
    =<level information>+<latitude of the left down corner of the rectangle>
     +<longitude of the left down corner of the rectangle>
```

<level information>=Lv1 | Lv2 | Lv3 | Lv4 | Lv5 | Lv6
<latitude of the left down corner of the rectangle>
    =numeric value(decimal degree notation with two digits after decimal point)
<longitude of the left down corner of the rectangle>
    =numeric value(decimal degree notation with two digits after decimal point)

(example)   map level=Lv4

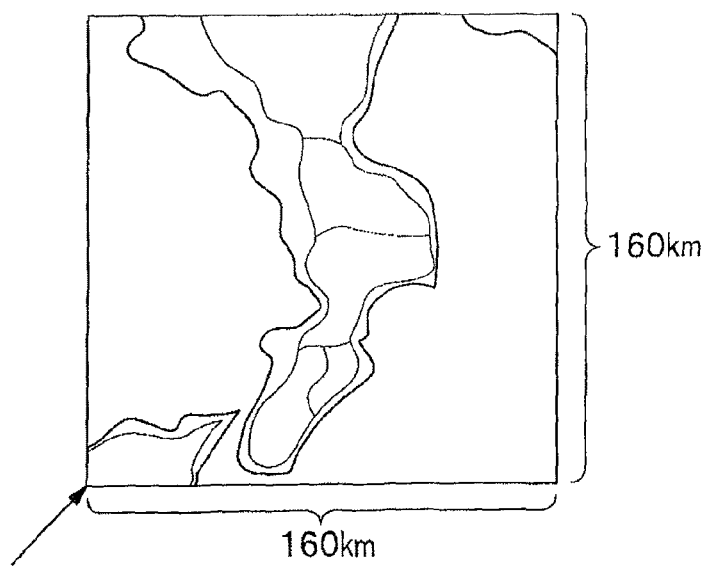

160km

160km (latitude, longitude)=(40, 14)

parcel ID="Lv4+40.00+14.00"

FIG.7

Naming convention of a DB file and storing relations in map data

Files to make up map database (DB file)
├── Lv1_4<latitude of the left down><longitude of the left down>
│   Map data structure included in a DB file (covering area: 320x320km)
│   ※Total 64 files exist as DB files
│   ├── Lv1 (2.5km × 2.5km) 16384 pieces
│   ├── Lv2 (10km × 10km) 1024 pieces
│   ├── Lv3 (40km × 40km) 64 pieces
│   └── Lv4 (160km × 160km) 4 pieces
│
└── Lv5_6<latitude of the left down><longitude of the left down>
    Map data structure included in a DB file (covering area: 2560km × 2560km)
    ※Only one file exists as a DB file
    ├── Lv5 (640km × 640km) 16 pieces
    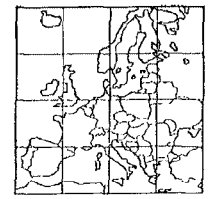
    └── Lv6 (2560km × 2560km) 1 pieces

Main Process of the Car Navigation System

DB File Update ~S43

FIG.12A
~1402

```
DB File Name List

"File Name", "Self-Location vicinity bit", "File Size (KB)", "Delete Status", "Copy Status"
PPB0e120,        0,         120,     not deleted,    not copied
PPB0f120,        0,         160,     not deleted,    not copied
PPB10120,        0,         160,     not deleted,    not copied
PPB11120,        1,         160,     do not delete,  not copied
  ...
```

※The Self-Location vicinity bit is set to "1" when the file includes
the self-location vicinity, and otherwise it is set to "0".
The DB file that includes the self-location vicinity should not be deleted while copying,
and the Delete Status is set to "do not delete" until the copying is completed.

FIG.12B 

```
DB File Name List

"File Name", "Self-Location vicinity bit", "File Size (KB)", "Delete Status", "Copy Status"
PPB0e120,        0,         120,     deleted,        not copied
PPB0f120,        0,         160,     deleted,        not copied
PPB10120,        0,         160,     not deleted,    not copied
PPB11120,        1,         160,     do not delete,  not copied
  ...
```

FIG.12C 

```
DB File Name List

"File Name", "Self-Location vicinity bit", "File Size (KB)", "Delete Status", "Copy Status"
PPB0e120,        0,         120,     deleted,        copied
PPB0f120,        0,         160,     deleted,        not copied
PPB10120,        0,         160,     deleted,        not copied
PPB11120,        1,         160,     do not delete,  copied
  ...
```

FIG.15

Navigation Application Consistency Management Table ~103

| Application Name | Parcel count | Parcel ID List | Update Completion Flag |
|---|---|---|---|
| Self-Location Application | 4 | 0x12341234 0x12341236<br>0x12341235 0x12341237 | completed |
| HMI Application | 9 | 0x12341234 0x12341236 .....<br>0x12341235 0x12341237<br>: | not completed |
| Route Guidance Application | Parcel including a guidance route | 0x12341234<br>0x12341239 | completed |

Management Information —42

| Item | Value |
|---|---|
| Page Size | 10kB |
| Page Count | 200 |
| Page Number List | 1010, 1011, ····· |
| Parcel ID | 0x12345678 |
| Data Type | Guidance Data |
| Update-permit-flag | OK |
| Mismatch-flag | mismatch |

Map Data on the Map Media　　　　　　　Map Data on the HDD
FIG.18A
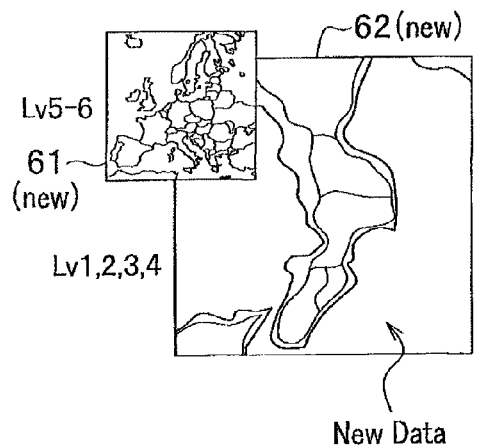
New Data
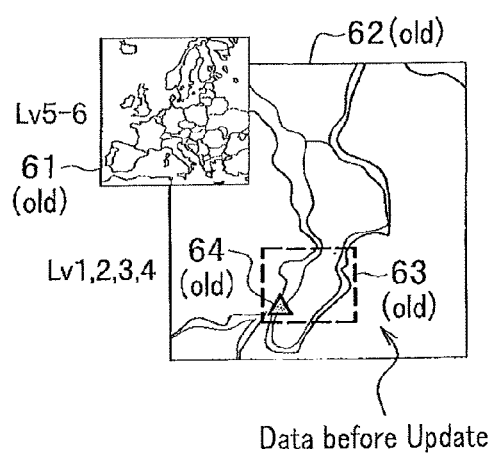
Data before Update
FIG.18B
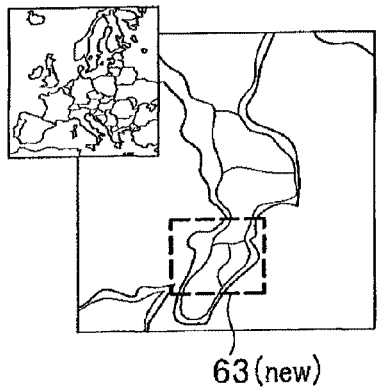
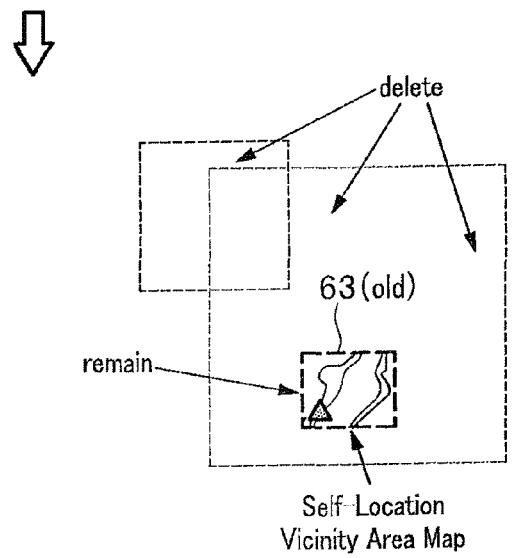

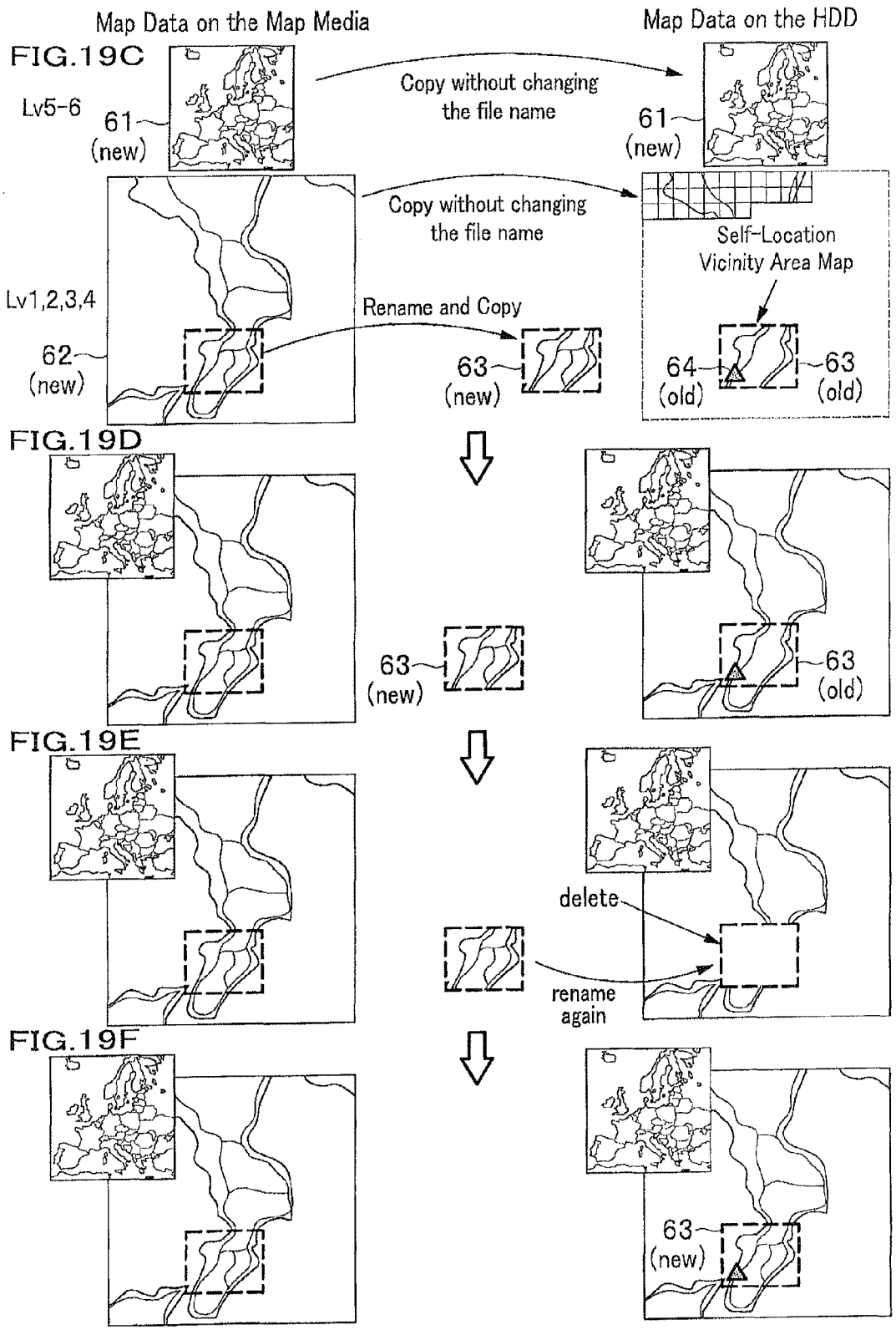

Map Data on the Map Media
Map Data on the HDD
FIG. 20A
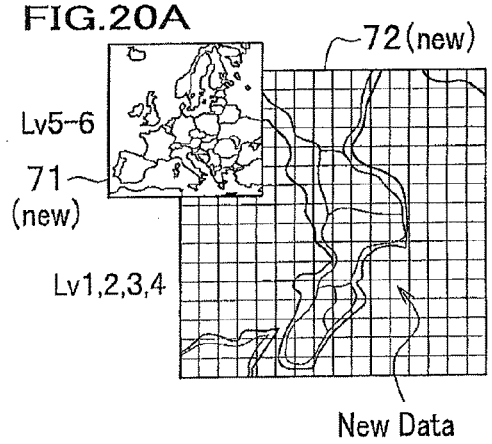
Lv5-6
71 (new)
Lv1,2,3,4
72 (new)
New Data
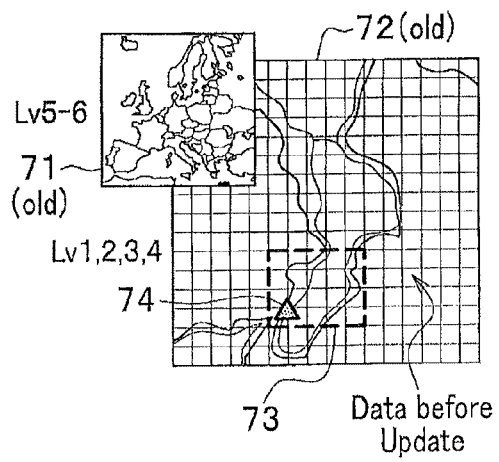
Lv5-6
71 (old)
Lv1,2,3,4
72 (old)
74
73 Data before Update
FIG. 20B
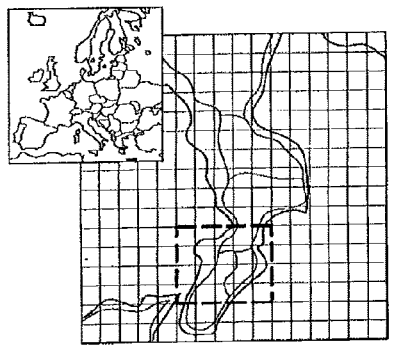
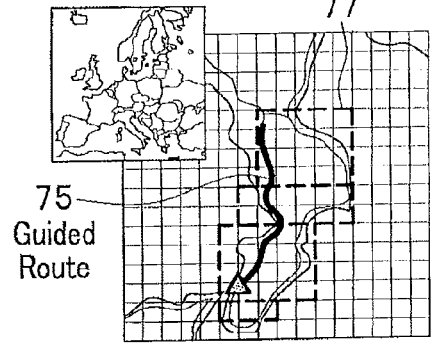
Guided Route Vicinity Area Map
77
75 Guided Route
FIG. 20C
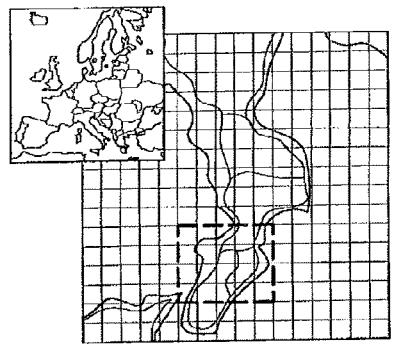
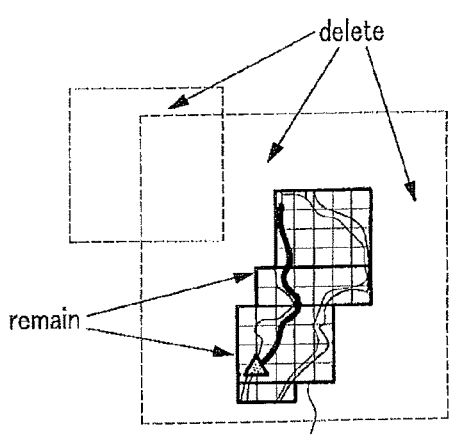
delete
remain
77
Guided Route Vicinity Area Map

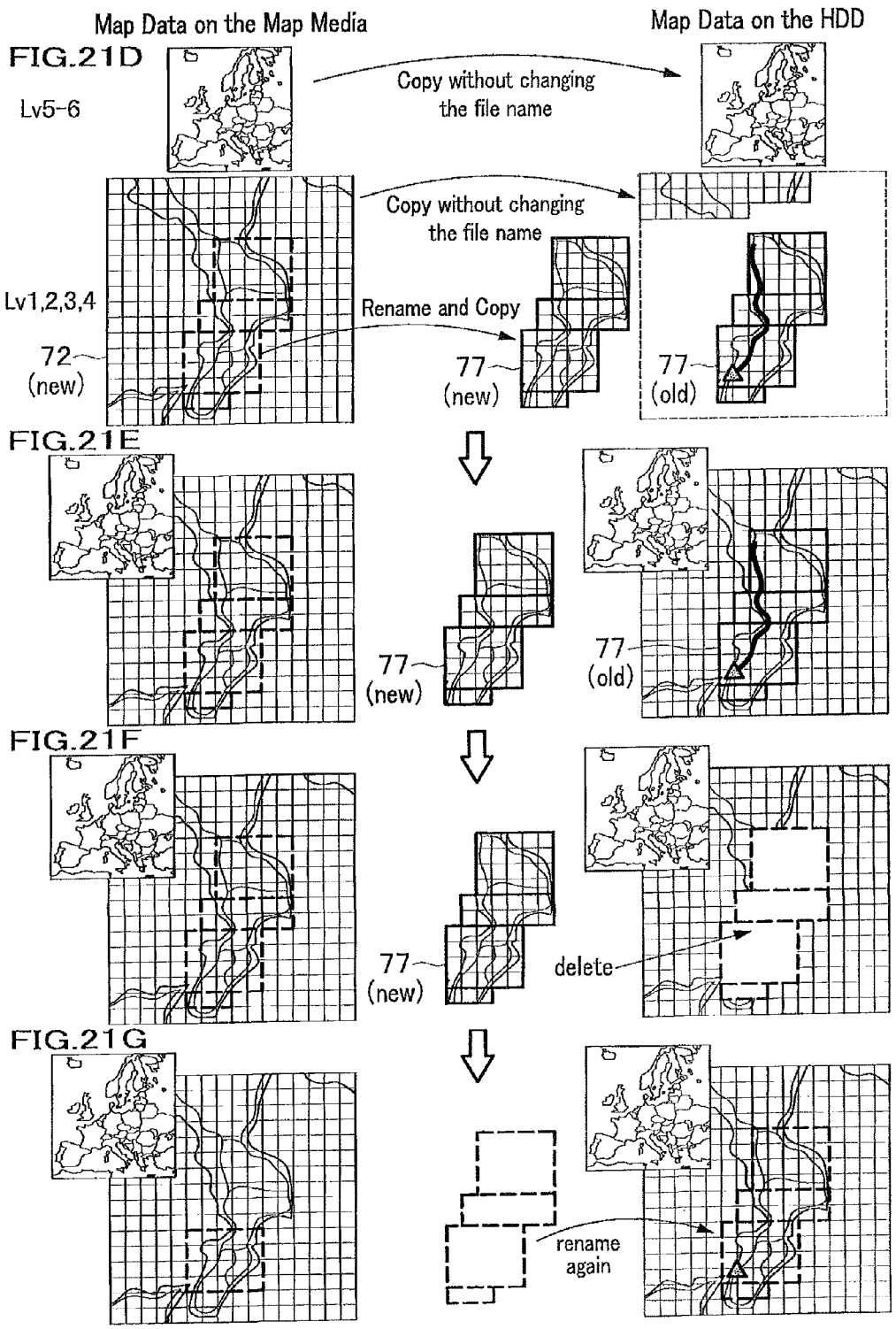

CAR NAVIGATION SYSTEM, PROGRAM AND METHOD FOR UPDATING MAP DATA

CROSS REFERENCE TO RELATED APPLICATION

The present application claims benefit of the filing dates of Japanese Patent Application No. 2009-151997 filed on Jun. 26, 2009, which is incorporated herein by reference.

BACKGROUND OF THE INVENTION

1. Field of the Invention

The present invention relates to a car navigation system and a program thereof, and a method for updating map data used in the car navigation system.

2. Description of the Related Art

In recent years, navigation systems for vehicles driving on a road (hereinafter referred to as "car navigation system") have been used in all over the world.

A car navigation system locates a self-location based on map data stored in a Hard Disk Drive (HDD) etc. and latitude/longitude data acquired via radio waves sent from a Global Positioning System (GPS) satellite, and displays a map of the located self-location and its vicinity on a display.

In addition, a car navigation system performs a route search from the self-location to a destination by locating the destination on the map data according to the user's operation, then displays the searched route on the map on the display, and provides an image and audio guidance for route guidance when the vehicle drives along the searched route.

Map data for a car navigation system is stored in a format so called, KIWI format, A format, and I format and the like. Conventionally, it is stored in portable storage media such as a Compact Disk-Read Only Memory (CD-ROM) Digital Versatile Disk-Read Only Memory (DVD-ROM), and distributed to an end user through a car navigation system vendor.

When the new map data is provided with portable media, the end user of a car navigation system updates the map data by replacing old map data in a hard disk drive with the new map data in the portable media.

However, considering the fact that data to be updated is usually at most a few percents of the total map data, it is not an efficient way to update map data via portable media. In addition, in such a method using portable media, it is difficult to keep up with the changes in a road map caused by daily road constructions and repairs. Furthermore, provision of such new map data becomes available usually at most once a year, and as a result, considerable number of places include deviation between map data in a car navigation system and the actual road conditions.

In light of these situations recently, such services started that generate map difference data between an old map and a new map, and distribute the map difference data via communications and broadcasting. In such cases, since no portable media is used, troublesome tasks in vendors and users can be reduced. As a result, the updating frequency of map data can be increased from once a year to once in every two or three months.

However, in the case of distributing map difference data, since communications and broadcasting are used as a distribution means, it takes long time for the distribution and update despite using difference map data to reduce the data size. At present, it takes about 30 minutes for updating map data for Tokyo only.

For example, JP1999-95657 discloses a method for updating map data in which, map data before update is temporarily saved when updating map data, and operations of the car navigation system is continued using the map data before update. When updating entire map data is completed then the car navigation system switches to the operation using the new map data.

In addition, JP2003-315056 discloses an example of a car navigation system in which, map data is formed hierarchically and map data that includes the current vehicle location is updated to reduce the map distribution time and cost. The car navigation system temporarily stores both new and old map data with regard to the updating map data, and performs route guidance using the new map data when self-location is in the updating area, and using the map data before update when the self-location is outside the updating area.

According to the method for updating map data disclosed in JP1999-95657, a car navigation system can continue normal operation even when updating map data is in progress. However a problem is still remained that it takes long time before new map data becomes usable. In addition, since it uses map data before update when updating map data is in progress, there is a possibility of displaying guidance information that does not match the real situation.

According to the car navigation system disclosed in JP2003-315056, there is a possibility of mismatches between data near the border of updated map data and the adjacent map data that is not updated yet, causing inconsistency between displayed map data and route guidance data.

As stated above, in conventional techniques, it is difficult to satisfy both of, making the updated map data to be usable rapidly, and performing a route search and displaying guidance data without inconsistency using map data before update and map data after update.

SUMMARY OF THE INVENTION

Accordingly, an object of the present invention is to provide a car navigation system, a program and a method for updating map data that ensures a normal operation of the car navigation functions even when updating map data is in progress, and making the updated map data usable quickly.

A car navigation system according to an aspect of the present invention includes: map data storing means for storing map data of a plurality of areas into respective map data files; display means for displaying the map data; location acquisition means for acquiring a self-location; destination determination means for determining a destination; and a central processing unit; wherein the car navigation system searches a guided route from the self-location to the destination by referring to the map data storing means, and displays the guided route on the display means. The central processing unit executes the following processes.

(1) Identifying a map data file that includes a destination, a guided route and its vicinity, necessary for executing an application program, per each application program in the car navigation system, from a plurality of map data files stored in the map data storing means.

(2) Monitoring an update status of the identified map data file when updating map data files stored on the map data storing means.

(3) Preparing information in which the update status of the map data file obtained by the above monitoring process and identification data of the map data file are associated with the application program, and storing the information into a storage device as management information for managing the operation consistency of the application program.

(4) In a case of updating map data files of which identification data is included in the management information, updating the map data file with reference to the execution status of the application program, and in a case of updating map data files of which identification data is not included in the management information, updating the map data file without reference to the execution status of the application program.

As stated above, in the present invention, each application program in the car navigation system specifies a map data file necessary for the execution of the application program, and monitors the update status of the identified map data file. Accordingly, it is possible to execute the application program normally when the map data file necessary for the execution of the application program is updated, without waiting for all map data files to be updated.

In addition, in the present invention, since the identified map data file is updated associating with the execution status of the application program, it is possible to ensure the normal operation of the car navigation system.

The present invention provides normal operation of the car navigation system even when update of the map data is in progress, and makes the updated map data usable quickly.

BRIEF DESCRIPTION OF THE DRAWINGS

FIG. 6 is an explanatory diagram for explaining a concept of a parcel that constructs map data;

FIG. 7 is an explanatory diagram for explaining a concept of a file structure of a map database;

FIGS. 12A to 12C are explanatory diagrams for explaining a structure of a DB file name list;

FIG. 15 shows a structure example of a navigation application consistency management table;

FIGS. 18A and 18B show a first example representing how map data on the HDD is updated according to map data on a map media;

FIGS. 19C to 19F show a first example representing how map data on the HDD is updated according to map data on a map media (continued);

FIGS. 20A to 20C show a second example representing how map data on the HDD is updated according to map data on a map media; and FIGS. 21D to 21G show a second example representing how map data on the HDD is updated according to map data on a map media (continued).

DETAILED DESCRIPTION OF THE PREFERRED EMBODIMENTS

An embodiment of the present invention will be explained in detail by referring to figures, as needed.

Figure 1:
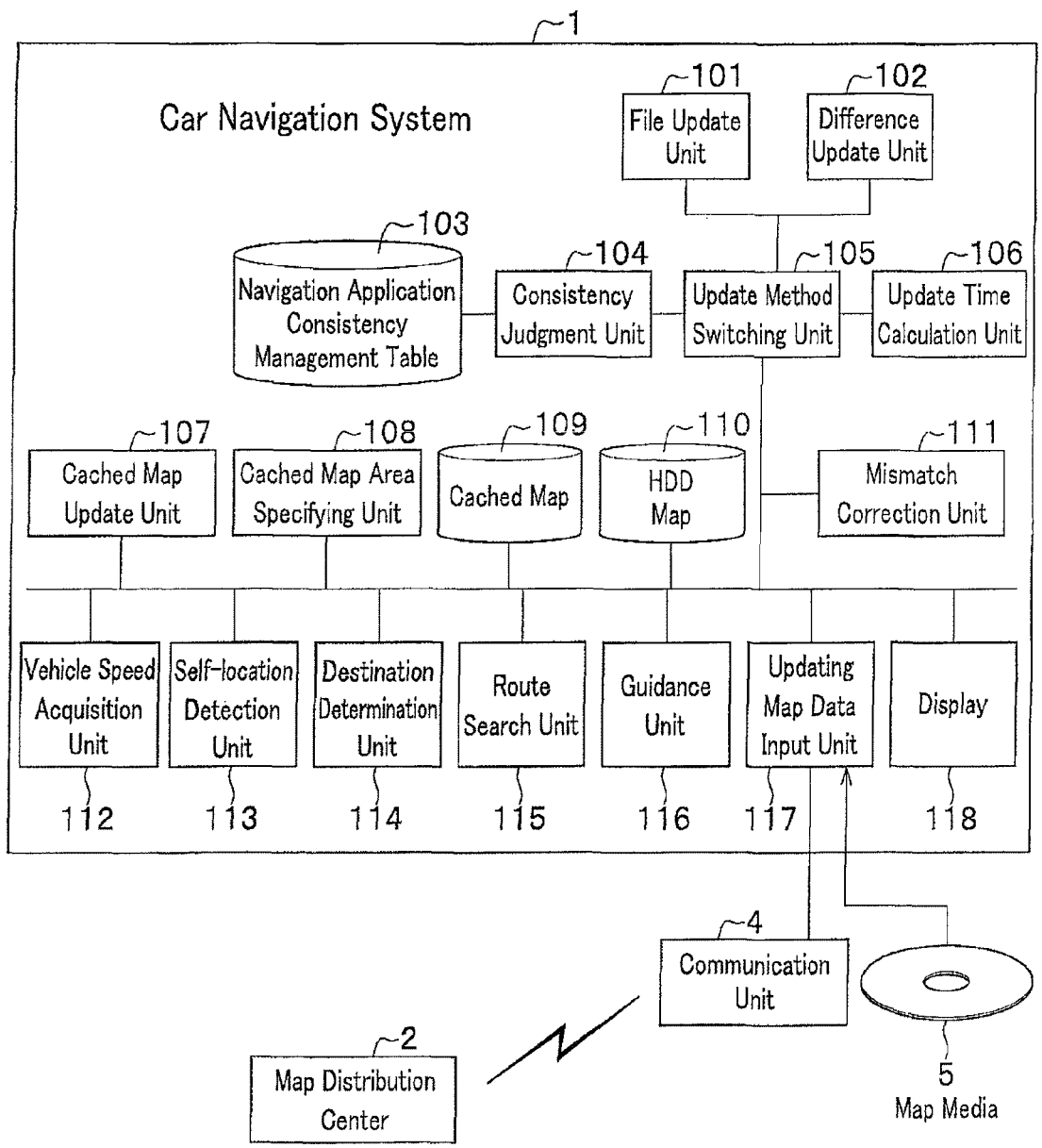
FIG. 1 shows a functional block diagram of a car navigation system in accordance with an embodiment of the present invention.

FIG. 1 shows a functional block diagram of a car navigation system in accordance with an embodiment of the present invention.

As shown in FIG. 1, the car navigation system 1 is equipped with an HDD map 110 including a map database, and for implementing so called navigation functions the car navigation system 1 is also equipped with function blocks such as: a vehicle speed acquisition unit 112 for acquiring a vehicle speed, a self-location detection unit 113 for detecting a self-location by specifying latitude/longitude via radio waves sent from a GPS satellite, a destination determination unit 114 for setting a POI selected by a user as a destination, a route search unit 115 for performing a route search from the self-location to the destination, a guidance unit 116 for performing guidance of intersections based on the result of the route search, a display 118 for displaying a map and route guidance, and so on.

These functional blocks are embodied by having a Central Processing Unit (hereinafter referred to as "CPU"), which is not shown in the figure, executing predefined programs loaded on a main memory (not shown). Hereinafter, the programs for implementing these function blocks are called "navigation applications".

The car navigation system 1 further includes a cached map 109, and specific functional blocks in this embodiment such as: an updating map data input unit 117, a cached map area specifying unit 108, a cached map update unit 107, a file update unit 101, a difference update unit 102, an update method switching unit 105, an update time calculation unit 106, a navigation application consistency management table 103, a consistency judgment unit 104, a mismatch correction unit 111, and the like.

An updating map data input unit 117 is inputted a map data for update that is distributed from the map distribution center 2 and received by the communication unit 4 via communications or broadcasting, or reads a map data for update recorded on a map media 5 that is formed of a portable storage media and the like. Meanwhile, the communication unit 4 is a communication device such as a cellular phone, a receiver for broadcasting etc.

A file update unit 101 and difference update unit 102, using the map data for update inputted via the updating map data input unit 117, update map data files (hereinafter referred to as "DB file") which constitute a map database in the HDD map 110. Here, the HDD map 110 is configured on an HDD (not shown), and the structure of the map database will be described later referring to figures as needed.

In addition, the file update unit 101 updates the map database on the HDD map 110 by a DB file as a unit, and the difference update unit 102 updates the map database by a difference data unit. Further, the update method switching unit 105 switches update methods for updating map data (updating by a file as a unit or updating by difference data). The update time calculation unit 106 calculates necessary time for updating the map data for each updating method.

The cached map 109 is prepared by picking up map data that is frequently used by navigation applications and storing it in the main memory or in high-speed auxiliary storage media like an HDD, for implementing the high-speed access to the map data.

The cached map area specifying unit 108 specifies a target area in the map data that should be cached in the cached map 109 based on the self-location or a guided route to the destination. In that case, the target area for the cache is specified for each navigation application (self-location detection, route search, route guidance etc.) considering a necessary area to ensure the normal operation of the application. It is assumed that, the necessary areas are defined in advance for each navigation application, by specifying whether the area includes a self-location or destination only, or includes the adjacent areas.

Consequently, in this embodiment, the cached map area specifying unit 108 specifies target areas to be cached for each navigation application, and stores the name (identification data) of a DB file that holds the specified target area into a navigation application consistency management table 103 making it associated with the navigation application. The navigation application consistency management table 103 will be explained later in detail referring to FIG. 15.

The cached map update unit 107 updates the map data stored in the cached map 109 based on the map data on the HDD map 110 if an area specified by the cached map area specifying unit 108 has a change. In addition, it updates the map data stored in the cached map 109 when map data for update that corresponds to an area cached in the cached map 109 is inputted via the updating map data input unit 117.

Meanwhile, the cached map update unit 107, when updating the cached map 109 based on the map data for update, refers to the navigation application consistency management table 103, and monitors whether or not DB files that correspond to areas listed up to be cached are updated, and stores the monitoring result into the navigation application consistency management table 103.

The consistency judgment unit 104 refers to the navigation application consistency management table 103 and judges whether map DB files that are used by the navigation applications, in other words the DB files cached in the cached map 109, are under updating (updating is not completed), or updating is completed. If the updating is not completed, it is judged that the navigation application has inconsistency. The mismatch correction unit 111, in the case of the consistency judgment unit 104 judges that there is inconsistency, executes appropriate processes in the navigation application for correcting the inconsistency of the map data.

Figure 2:
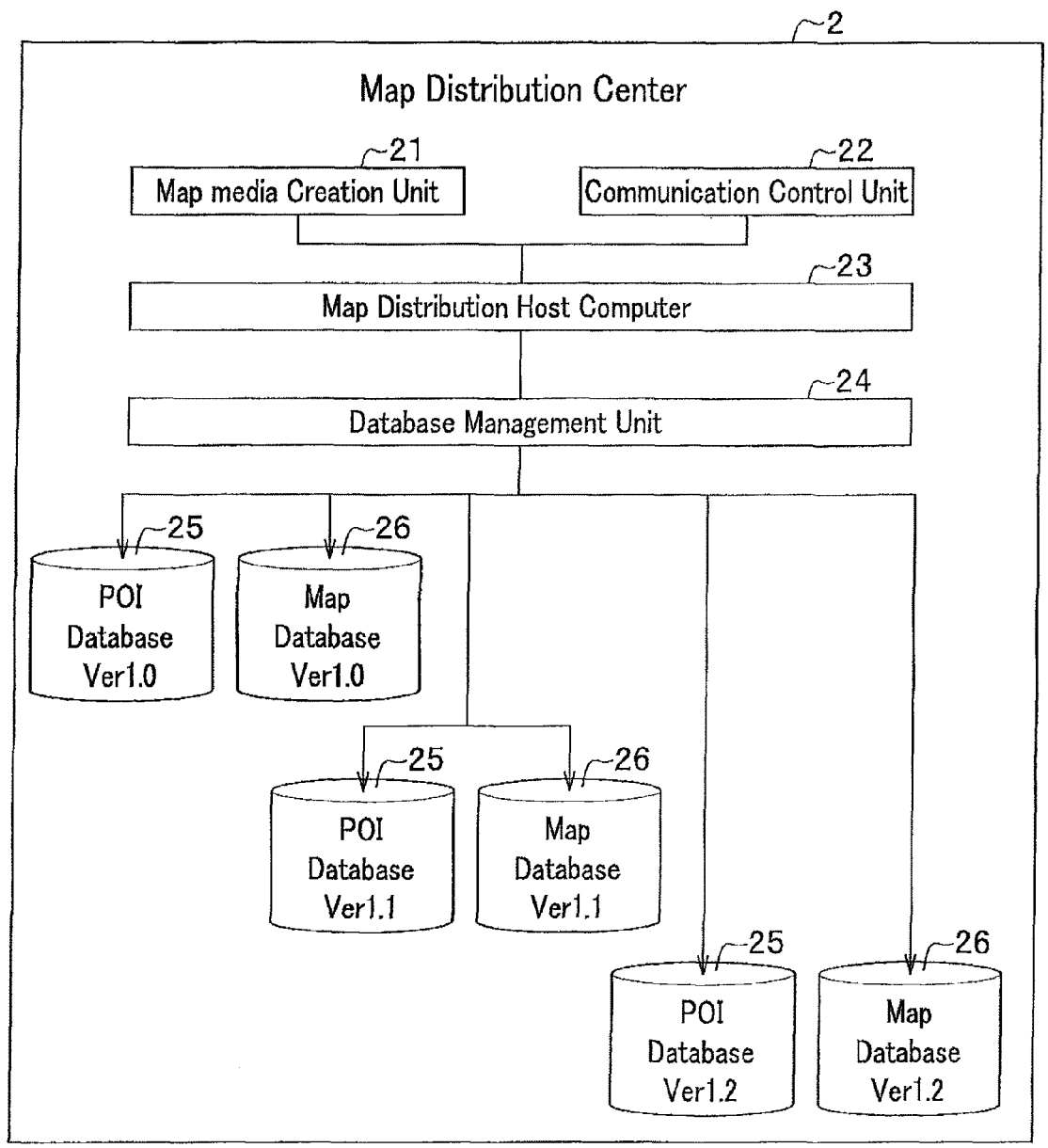
FIG. 2 shows a configuration example of a map distribution center in accordance with an embodiment of the present invention.

FIG. 2 shows a configuration example of a map distribution center 2 in accordance with an embodiment of the present invention.

As shown in FIG. 2, the map distribution center 2 is constituted by: a map media creation unit 21, a communication control unit 22, a map distribution host computer 23, a database management unit 24, and a plurality of versions of POI databases 25 and map databases 26.

The map distribution host computer 23 creates entire map data or difference map data based on designated-version information inputted via the map media creation unit 21 or the communication control unit 22.

Here, the entire map data means map data that are included in the map database 26 managed by the database management unit 24 and having a version specified by the designated-version information. However, the entire map data used for updating map data does not need to include DB files for map data that does not require updating. In addition, the difference map data means a difference in map data between the map data in a map database 26 of a version designated by the designated-version information and map data in a map database 26 of the latest version.

The map distribution host computer 23 outputs the entire map data or the difference map data to the map media creation unit 21, and the map media creation unit 21 generates map media 5 with the entire map data or the difference map data stored therein (see FIG. 1: CD-ROM, DVD-ROM and the like). In addition, the map distribution host computer 23 outputs the difference map data to the communication control unit 22, and transmits it to the car navigation system 1 via communication networks or airwaves.

Meanwhile, as shown in FIG. 2, there is provided a POI database 25 which is similar to the map database 26. In this embodiment however, they are referred to with a generic name "map database". In addition, files that form a map database are referred to as "DB file", and data that forms the DB file is referred to as "map data".

Figure 3:
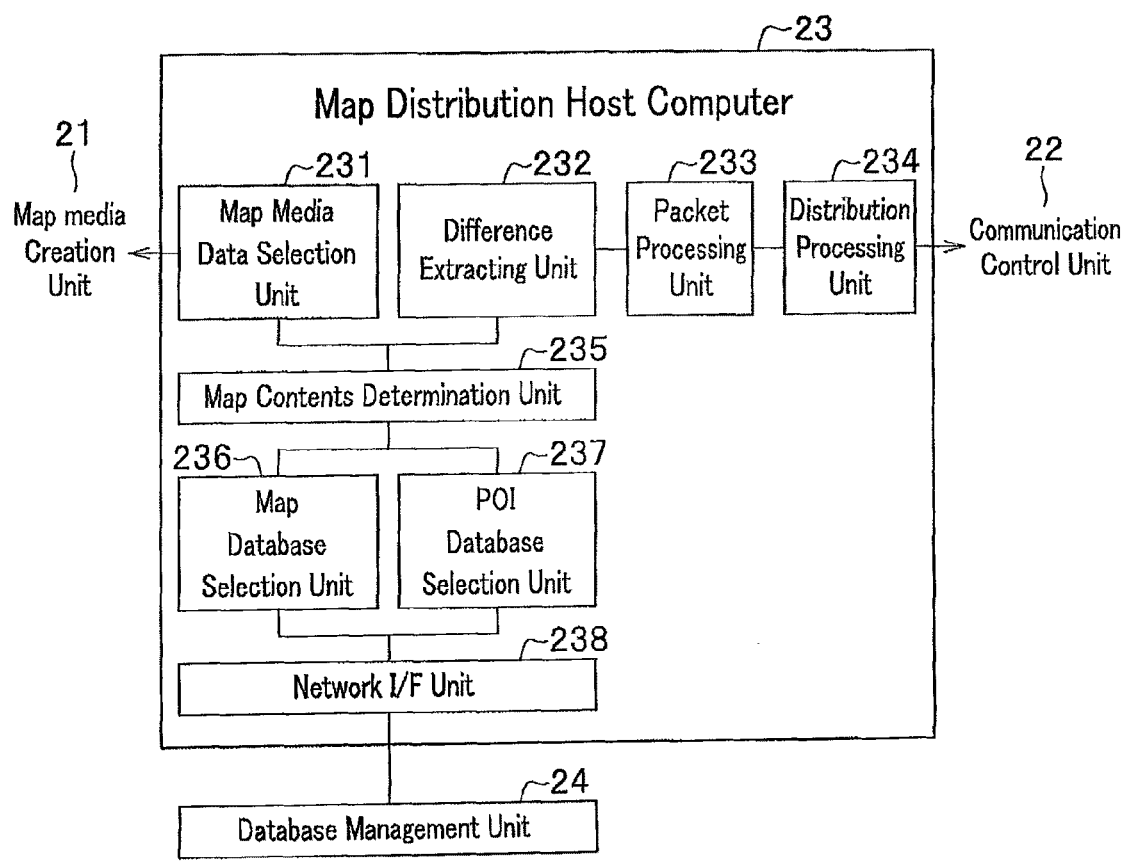
FIG. 3 shows an internal architecture example of a map distribution host computer.

FIG. 3 shows an internal architecture example of a map distribution host computer 23. The map distribution host computer 23 performs the main operation of the map distribution center 2. As shown in FIG. 3, the map distribution host computer 23 includes: a map media data selection unit 231, a difference extracting unit 232, a packet processing unit 233, a distribution processing unit 234, a map contents determination unit 235, a map database selection unit 236, a POI database selection unit 237, a network I/F unit 238 and the like.

The map media data selection unit 231 selects a DB file that includes map data of target areas for map media 5 to be created, when outputting entire map data or difference map data to the map media creation unit 21. The difference extracting unit 232 extracts the difference data between map databases in two different versions (usually one of them is the latest version).

The packet processing unit 233 converts the difference data extracted by the difference extracting unit 232 to a packet format used for transmissions via broadcasting or communication networks. The distribution processing unit 234 outputs the packetized difference data to the communication control unit 22, and multiplexes the data on a data transmission line that includes data broadcasting, data communications like data carousel or IP data.

The map contents determination unit 235 determines the map data (data for the map database 26, data for the POI database 25, or data for both) to be outputted to the map media creation unit 21 or the communication control unit 22, based on the data inputted from a input device (not shown) attached to the map distribution host computer 23.

The map database selection unit 236 and the POI database selection unit 237 select target POI database 25 or map database 26, based on the map data determined by the map contents determination unit 235, via the network I/F unit 238 and the database management unit 24.

Here, it is assumed that the map distribution host computer 23 and the database management unit 24 are connected via a high-speed LAN or the like installed in the map distribution center 2.

Figure 4:
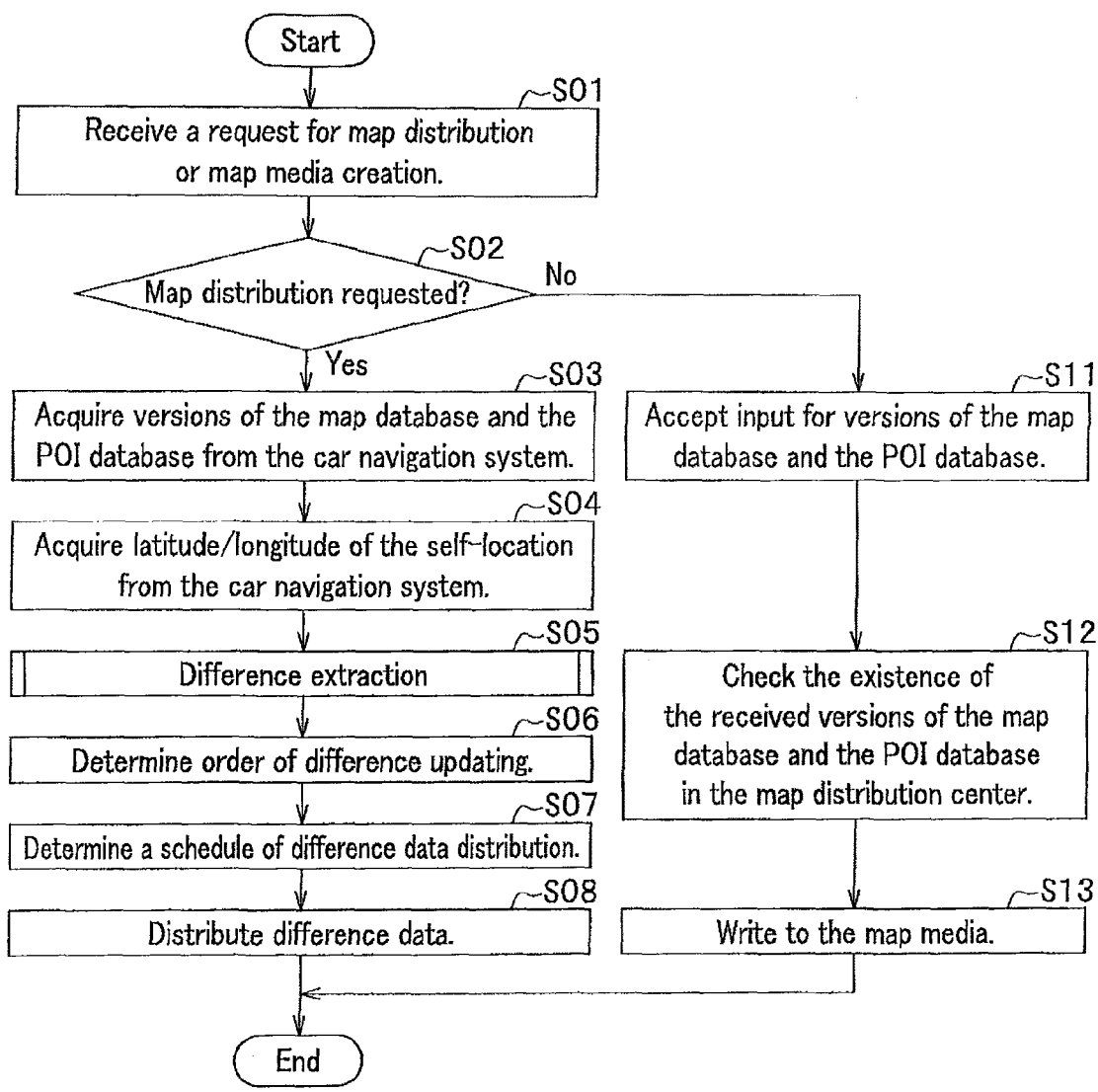
FIG. 4 shows a processing flow example of a main process in the map distribution host computer.

FIG. 4 shows a processing flow example of a main process in the map distribution host computer 23.

As shown in FIG. 4, the map distribution host computer 23 first receives a request for distribution of map data or creation of map media inputted via the map media creation unit 21, via the communication control unit 22 or via an input device like keyboard (not shown) (step S01). If the request is a request for distribution of map data ("Yes", in step S02), the map distribution host computer 23 acquires a version of the map database and the POI database which are possessed by the map distribution host computer 23 at that time (step S03), and acquires latitude/longitude information of the self-location from the car navigation system 1 (step S04).

Next, the map distribution host computer 23 executes a difference extraction process for extracting difference data for map data on each area (step S05). In addition, the map distribution host computer 23 determines a difference update order in the car navigation system 1 based on the latitude/longitude information of the self-location etc. (step S06), determines a distribution schedule of the difference data (step S07), and transmits the difference data to the car navigation system 1 (step S08).

If the request received in step S01 is not a request for distribution of map data but a request for creating map media ("No", in step S02), the map distribution host computer 23 accepts an input of version information for the POI database 25 and the map database 26 via an input device like a keyboard (step S11).

Next, the map distribution host computer 23 confirms, via the database management unit 24, that the POI database 25 and the map database 26 specified by the version information above exist in the map distribution center 2 (step S12), and stores the POI database 25 and the map database 26 specified by the version information above into map media 5 (step S13). If the specified databases do not exist, a warning may be displayed, for example, on a display.

Although the entire map data is used in this embodiment for generating map data for update by the map media creation unit 21, difference data may be used instead and there is no such restriction in general.

Figure 5:
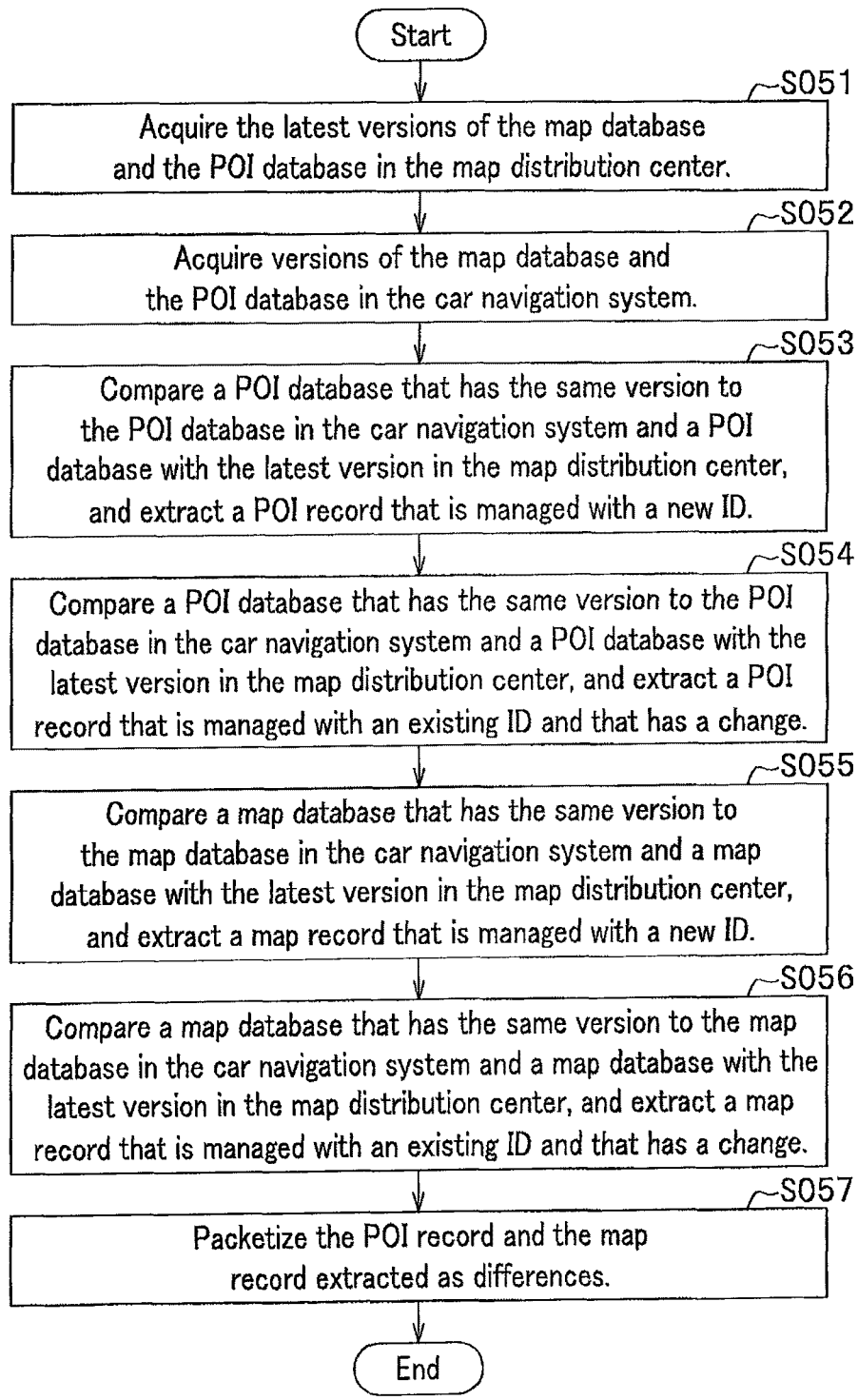
FIG. 5 shows a processing flow example of a difference extraction in the main process in the map distribution host computer.

FIG. 5 shows a flow chart example of a difference extraction process in the main process in the map distribution host computer 23. As shown in FIG. 5, the map distribution host computer 23, via the database management unit 24, first acquires version information on the latest POI database 25 and the map database 26 in the map distribution center 2 (step S051), and also acquires version information on the POI database 25 and the map database 26 in the car navigation system 1 based on the information sent from the car navigation system 1 (step S052).

Next, the map distribution host computer 23 retrieves and extracts a POI record managed with a new ID, from the POI database 25 of the latest version in the map distribution center 2, and the POI database 25 in the car navigation system 1 of the same version (step S053). In a similar fashion, the map distribution host computer 23 retrieves and extracts a POI record managed with an existing ID and that has a change, from the POI database 25 in the latest version in the map distribution center 2, and from the POI database 25 in the car navigation system 1 in the same version (step S054). In the retrieval, a query using Structured Query Language (SQL) may be used.

Next, the map distribution host computer 23 retrieves and extracts a map record that is managed with a new ID, from the latest map database 26 in the map distribution center 2 and from the map database 26 in the car navigation system 1 each having the same version to each other (step S055). In a similar fashion, the map distribution host computer 23 retrieves and extracts a map record managed with an existing ID and that has a change, from the map database 26 in the latest version in the map distribution center 2 and from the map database 26 in the car navigation system 1 each having the same version to each other (step S056). In the retrieval, a query using Structured Query Language (SQL) may be made.

Next, the map distribution host computer 23 packetizes the POI record and the map record extracted as differences which are stated above, according to predetermined specifications for broadcasting and communications (step S057).

Hereinafter, a parcel and a file, which constructs the map database in this embodiment, will be explained by referring to FIG. 6 and FIG. 7. FIG. 6 is an explanatory diagram for explaining a concept of a parcel, which constitutes map data. FIG. 7 is an explanatory diagram for explaining a concept of a file structure of a map database.

As shown in FIG. 6, a parcel is a generic name that represents one of map division into which a larger map is divided with a predetermined size, and is identified with a parcel ID. In other words, a parcel ID is represented by combining level information that specifies the size of a rectangle and character information including latitude/longitude of the left down of the rectangle.

There are six levels included in the level information Lv1 to Lv6. The size of the rectangle in each level is defined with the length of a side of the rectangle: 2.5 km, 10 km, 40 km, 160 km, 640 km, and 2560 km, as shown in FIG. 7. The latitude/longitude information is represented by decimal degree notation with two digits after decimal point.

For example, if the parcel ID is represented as "Lv4+40.00+14.00", the location of the left down corner of the rectangle is Lat. 40 degrees N and Long. 14 degrees E, and the side of a rectangle is 160 km. When south latitude and west longitude are used for latitude/longitude information, a "−" sign is attached instead of a "+" sign.

According to a management architecture of the parcel ID, for example, the map distribution center 2 acquires a car navigation system type and parcel ID management information (for example, a parcel ID format definition information as shown in FIG. 6), the map distribution center 2 performs ID conversion according to the parcel ID format definition and distributes the map update data, which makes it possible to support distributions to various types of Personal Navigation Devices (PND). A car navigation system being capable of receiving map data for update from the map distribution center 2 can utilize such a map data update service.

Further, as shown in FIG. 7, when level information is Lv1 to Lv4 for example, a file that forms the map database 26 (referred to as "DB file" in this embodiment) includes map data included in a rectangle having a length of sides of 320 km, and when level information is Lv5-Lv6, it includes map data included in a rectangle having a length of sides of 2560 km.

Accordingly, a DB file of LV4 includes map data for four pieces of maps of areas having a length of sides of 160 km (four Lv4 parcels), a DB file of LV3 includes map data for 64 pieces of maps of areas having a length of sides of 40 km (64 Lv3 parcels), a DB file of LV2 includes map data for 1024 pieces of maps of areas having a length of sides of 10 km (four Lv4 parcels), and a DB file of LV1 includes map data for 16384 pieces of maps of areas having a length of sides of 2.5 km (16384 Lv1 parcels).

In addition, map data for Lv5 is stored in one DB file and map data for Lv6 is stored in another DB file. In other words, map data on an area having a length of sides of 2560 km (one Lv6 parcel) is stored in one DB file, and map data for an area having a length of sides of 640 km (four Lv5 parcels) is stored in another one DB file.

As stated above, if the entire area is a rectangle having a length of sides of 2560 km and Lv1-Lv4 DB files include areas having a length of sides 320 km, then Lv1-Lv4 DB files include 16 files in each level, and accordingly 64 files are included in four levels altogether.

In addition, names of DB files are represented by, in a similar fashion to a parcel ID, level information that specifies the size of a rectangle area, and character information combining latitude/longitude information of the left down of the rectangle.

Figure 8:
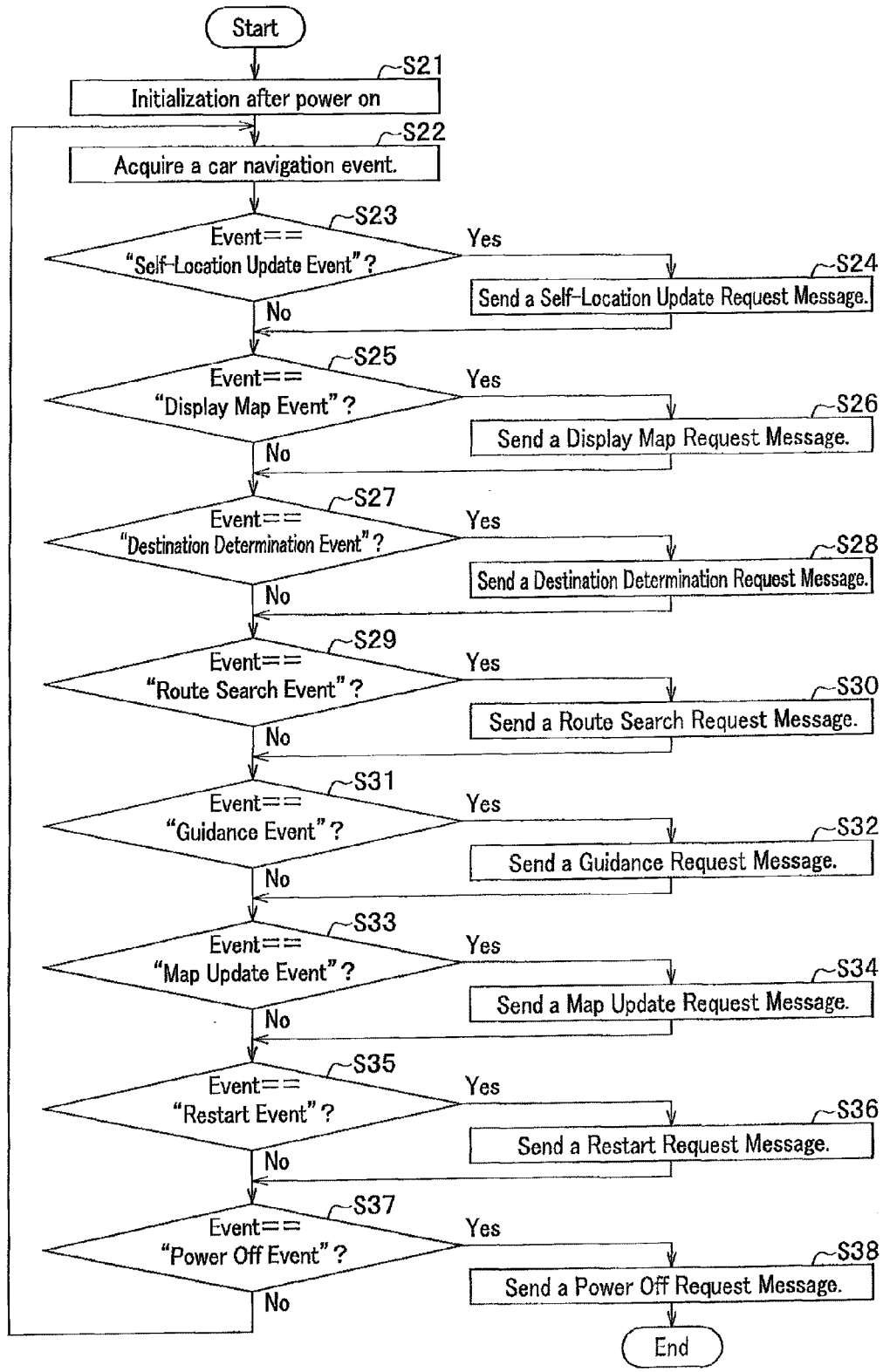
FIG. 8 shows a processing flow example of the main process in the car navigation system.

FIG. 8 shows a processing flow example of the main process in the car navigation system 1. Here, the main process means a series of processes from power being switched on to power being switched off in the car navigation system 1.

As shown in FIG. 8, when the car navigation system 1 is powered on, for example with an engine key, a CPU in the car navigation system 1 (hereinafter simply referred to as CPU) executes an initialization process such as loading an Operating System (OS) and navigation applications from an auxiliary storage to the main memory.

Next, the CPU enters into a loop process for acquiring a car navigation event (step S22). Here, the car navigation event means an interrupt event generated by, a communication unit 4, an input device, or a sensor interface and the like, which are attached to the car navigation system 1, or means an event generated by a timer or programs.

If the event is a "self-location update event" ("Yes", in step S23), the CPU sends a self-location update request message to a mailbox provided by the OS (step S24). After this, upon detecting the existence of the self-location update request message in the mailbox, the CPU starts a self-location update process, and acquires latitude/longitude of the self-location through GPS waves.

If the event is a "display map event" ("Yes", in step S25), the CPU sends a display map request message to a mailbox (step S26). After this, upon detecting the existence of the display map request message in the mailbox, the CPU displays a map that includes the self-location therein in a predetermined size on the display.

In a similar way, if the event is a "destination determination event" ("Yes", in step S27), the CPU sends a destination determination request message to a mailbox (step S28). If the event is a "route search event" ("Yes", in step S29), the CPU sends a route search request message to a mailbox (step S30). If the event is a "guidance event" ("Yes", in step S31), the CPU sends a guidance request message to a mailbox (step S32). If the event is a "map update event" ("Yes", in step S33), the CPU sends a map update request message to a mailbox (step S34). If the event is a "restart event" ("Yes", in step S25), the CPU sends a restart request message to a mailbox (step S36).

Further, if the event is a "power off event" ("Yes", in step S27), the CPU sends a process end request message to a mailbox (step S38), and ends the main process in FIG. 8.

Figure 9:
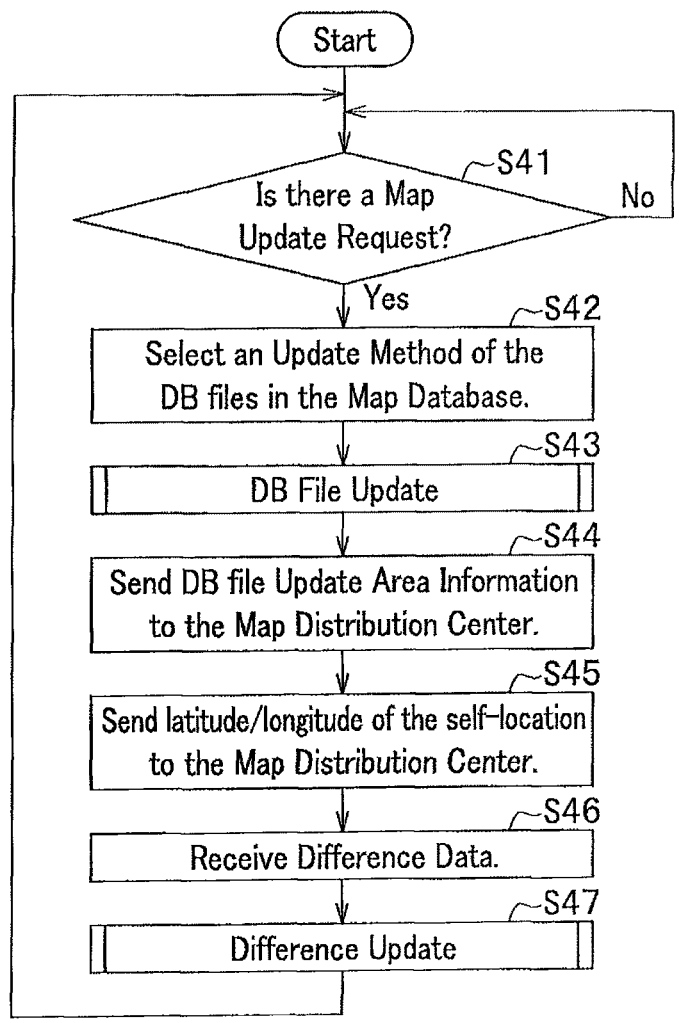
FIG. 9 shows a processing flow example of map update in the car navigation system.

FIG. 9 shows a flowchart example of a map update process in the car navigation system 1.

As shown in FIG. 9, the car navigation system 1 first checks if there is a map update request (step S41). If there is a map update request ("Yes", in step S41), the CPU selects an update method of the DB files constituting the map database of the map that do not contain the self-location on the guided route.

In step 42, the CPU may, for example, executes difference update on DB files of which map data is cached in the cached map 109, and executes entire map update on the other DB files of map data on other areas (hereinafter referred to as "file update"). In order to determine which one of file update and difference update is to be executed first, the update time calculation unit 106 calculates update time for each update method, and a method that has a shorter update time may be executed first. For example, if the file update has shorter update time than the difference update, and it is decided to execute file update first, the CPU will execute processes after step S42 according to the following order.

The file update can utilize ordinary I/F for a file processing in which an entire DB file is updated. On the other hand, implementing the difference update may require executing a set of processes like interpreting SQL statements for handling a relational database, analyzing table definitions, page retrieving in the physical space on HDD etc., on an embedded system. For this reason, when comparing update time between the file update and the difference update, there may be a case in which the file update is quicker than the difference update when the size of the updated data is larger than a certain level. Therefore, the comparing process can, considering processing characteristics of embedded systems like the car navigation system 1, implement a process that reduces the stress of the user when updating map data.

In other words, the CPU first executes DB file update for DB files in the map database (step S43). The processing flow of the DB file update will be explained later in detail referring to FIG. 11.

Next, the CPU sends DB file update area information (parcel ID), which specifies a target DB file for difference update, to the map distribution center 2 (step S44). Then the CPU sends latitude/longitude of the self-location to the map distribution center 2 (step S45).

In response, the map distribution center 2, upon receiving the DB file update area information and the latitude/longitude of the self-location, transmits a parcel of map data that includes an area of the self-location or difference data for the DB files to the car navigation system 1. Then the CPU in the car navigation system 1 receives the difference data (step S46), and executes difference update based on the received difference data. The processing flow of the difference update will be explained later in detail referring to FIG. 13.

Here, the execution sequence of the map update is not limited to what is shown in FIG. 9. For example, the DB file update (step S43) may be executed after the difference update (step S47). In this case, the cached map 109 is updated earlier than the HDD map 110, which makes the updated map data available faster to navigation applications.

Figure 10:
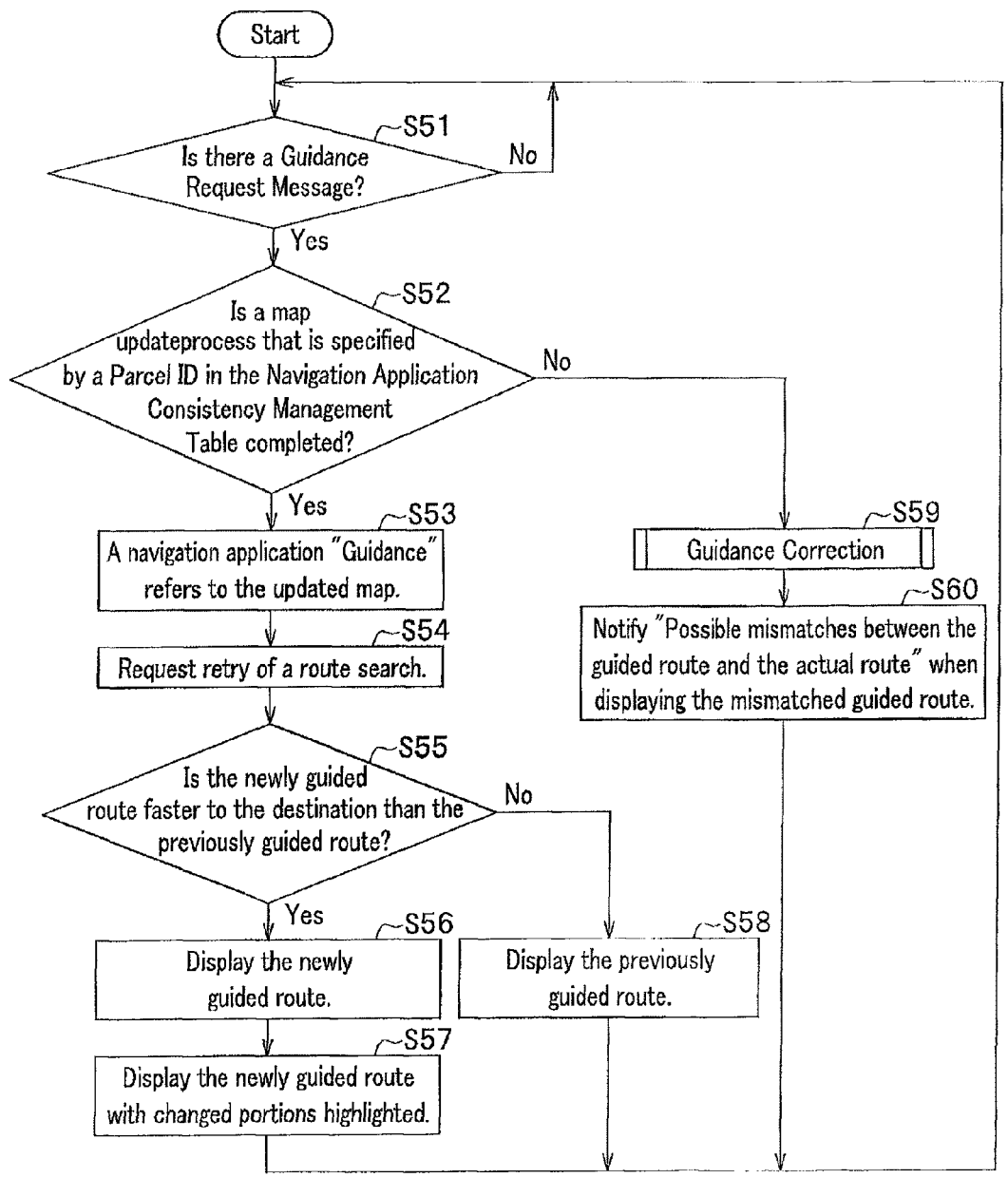
FIG. 10 shows a processing flow example of route guidance in the car navigation system.

FIG. 10 shows a processing flow example of route guidance in the car navigation system 1.

As shown in FIG. 10, the CPU in the car navigation system 1 first checks whether or not there is a guidance request message (step S51). When there is a guidance request message ("Yes", in step S51), the CPU refers to the navigation application consistency management table 103 on the navigation application "guidance", and determines whether or not a map update process that is specified by a Parcel ID is completed (step S52). If it turns out that the map update process being completed ("Yes", in step S52), the CPU has the navigation application "Guidance" refer to the updated map (step S53), and request retry of a route search by sending a route search request message (step S54).

After that, the CPU compares the guided route after retry of a route search with the previous guided route. If the newly guided route is faster to the destination than the previously guided route ("Yes", in step S55), displays the newly guided route on a display (step S56), and also displays the newly guided route with changed portions highlighted (step S57). In contrast, if the newly guided route is not faster to the destination than the previously guided route ("No", in step S55), displays the previously guided route on a display (step S58).

In addition, when the map update process is not completed ("No", in step S52), the CPU executes a guidance correction (step S59), and notifies "Possible mismatches between the guided route and the actual route" when displaying the mismatched guided route (step S60).

By executing conditional branching in the step S55 as stated above, it is automatically determined whether or not the newly guided route after map update is more advantageous than the previously guided route taken before map update is executed (for example, minimum time route), and the route is displayed on the display. Accordingly, the user is not disturbed by the map update. In addition, since the functions of the car navigation system 1 become effective upon completion of the map update, the user can utilize the functions immediately.

In addition, since a warning "Possible mismatches between the guided route and the actual route" is shown to a user in step S60, the user can figure out whether or not there is an inconsistency on the map after execution of the guidance correction (step S59), without any operation to the car navigation system 1 even while driving the vehicle.

Figure 11:
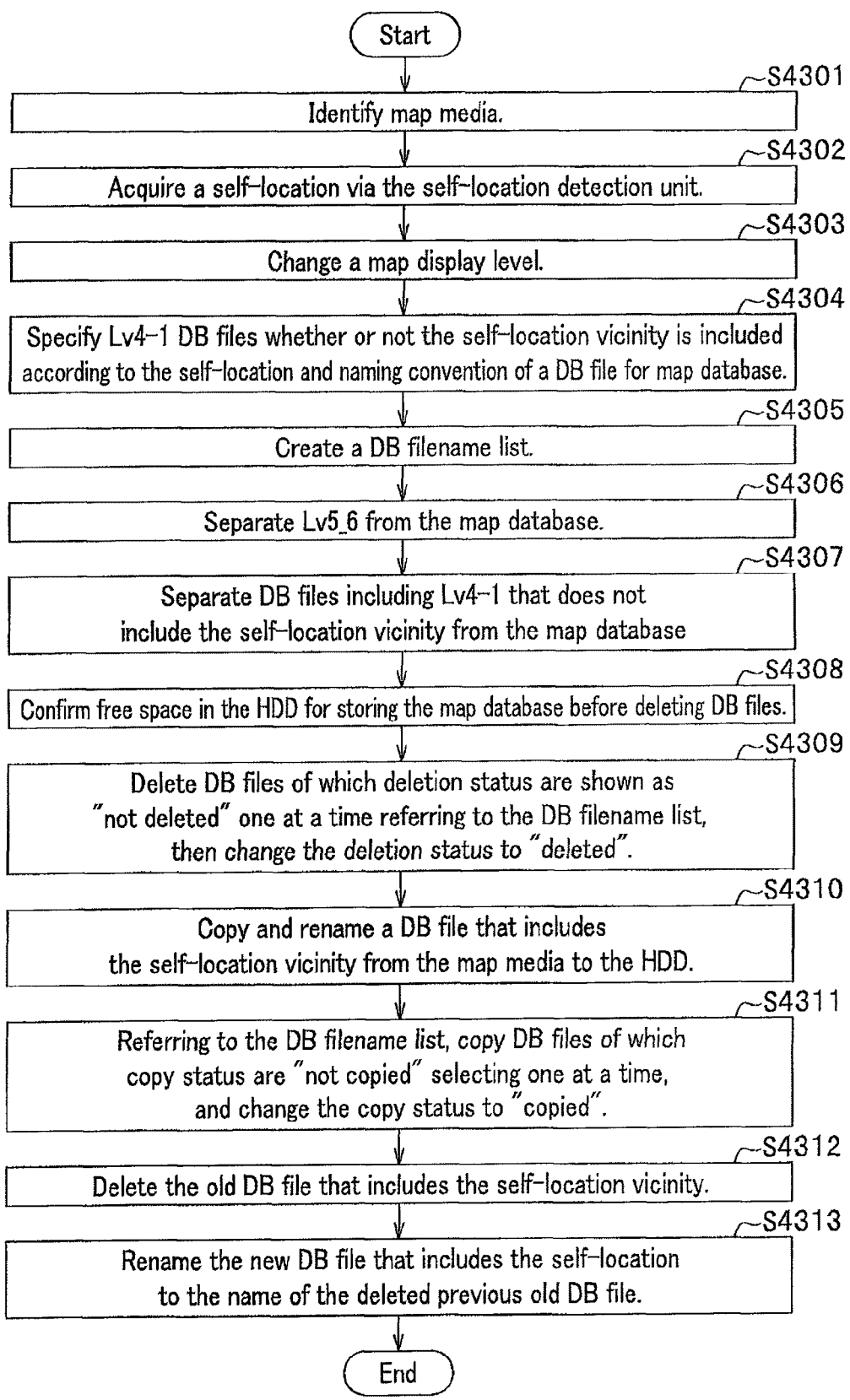
FIG. 11 shows a processing flow example of DB file update in the map update in the car navigation system.

FIG. 11 shows a processing flow example of DB file update in the map update in the car navigation system 1.

The CPU in the car navigation system 1 first identifies map media 5 (step S4301). Here, the map media 5 usually is portable storage media (CD-ROM, DVD-ROM and the like) with map data for update stored therein. However, the map distribution center 2 connected via a communication unit 4 may be broadly interpreted as map media 5.

Next, the CPU acquires a self-location via the self-location detection unit 113 (step S4302), and changes a map display level (step S4303). For example, the map display level Lv5 or Lv6 may be changed to Lv4.

Next, the CPU Specifies an Lv4-1 DB file whether or not the self-location vicinity is included according to the naming convention of a DB file for self-location and map database (step S4304), and creates a DB filename list (step S4305).

The structure of the DB filename list will be explained later in detail referring to FIG. 12. The DB file name list includes, "Self-Location vicinity bit", "File Size (KB)", "Delete Status", and "Copy Status" corresponding to respective filenames. In fact, a DB file with the "Self-Location vicinity bit" is "1" is the DB file that is cached in the cached map 109. Therefore, the "Self-Location vicinity bit" in the DB filename list may be set to "1" or "0" based on the names of a DB files listed corresponding to a self-location detection application, for example, in the navigation application consistency management table 103.

Next, the CPU separates DB files of Lv5-6 from the map database (step S4306), and separates DB files of Lv4-1 that does not include the self-location vicinity from the map database (step S4307). At this time, a DB file of Lv4-1 that corresponds to the self-location vicinity is still in the cached map 109, and these DB files are hereinafter referred to as "old self-location vicinity DB file"

Next, the CPU checks free space in the Hard Disk Drive (HDD) for storing the map database (step S4308). The process so far is preprocessing for the DB file update, and when the free space in the HDD is sufficiently large for the DB file update then the update is executed as follows.

The CPU first refers to the DB file name list, and deletes DB files of which deletion status are shown as "not deleted" one at a time, then change the deletion status to "deleted" (step S4309).

Next, the CPU refers to the DB file name list, then renames and copies a DB file that includes map data on the self-location vicinity from the map media to the HDD (step S4310). Hereinafter the DB files that are renamed and copied are referred to as "new self-location vicinity renamed DB file".

Next, the CPU, referring to the DB filename list, copies the DB files of which copy status are "not copied" selecting one at a time, and change the copy status to "copied" on the DB file name list (step S4311).

Next, the CPU deletes the old DB file that includes the self-location vicinity (step S4312), and renames the new DB file that includes the self-location to the name of the deleted old DB file (step S4313).

As stated above, update of the DB files that constitute the map database is completed.

FIGS. 12A to 12C are explanatory diagrams for explaining a structure of a DB file name list. As shown in the figures, the DB file name list 1402 includes, "File Name", "Self-Location vicinity bit", "File Size (KB)", "Delete Status", and "Copy Status", for each DB file in the map database. Herewith, the update status of the DB files that constitute the map database can be managed using the DB file name list 1402.

Incidentally, FIG. 12A shows an example of data stored in the DB file name list 1402 just after the step 4305 (see FIG. 11). In this case, the "self-location vicinity bit" of the DB file that includes the self-location vicinity is set to "1" based on the processing result of the step S4304.

In addition, FIG. 12B and FIG. 12C show examples of data stored in the DB file name list 1402 during the execution of the steps S4309 and S4311 respectively. In FIG. 12B, the delete status of the deleted DB file is changed from "not deleted" to "deleted". In FIG. 12C, the copy status of the copied DB file is changed from "not copied" to "copied".

In FIGS. 12A to 12C, the file names are character strings generated by encoding the parcel IDs and values for map display level according to a predetermined rule.

Figure 13:
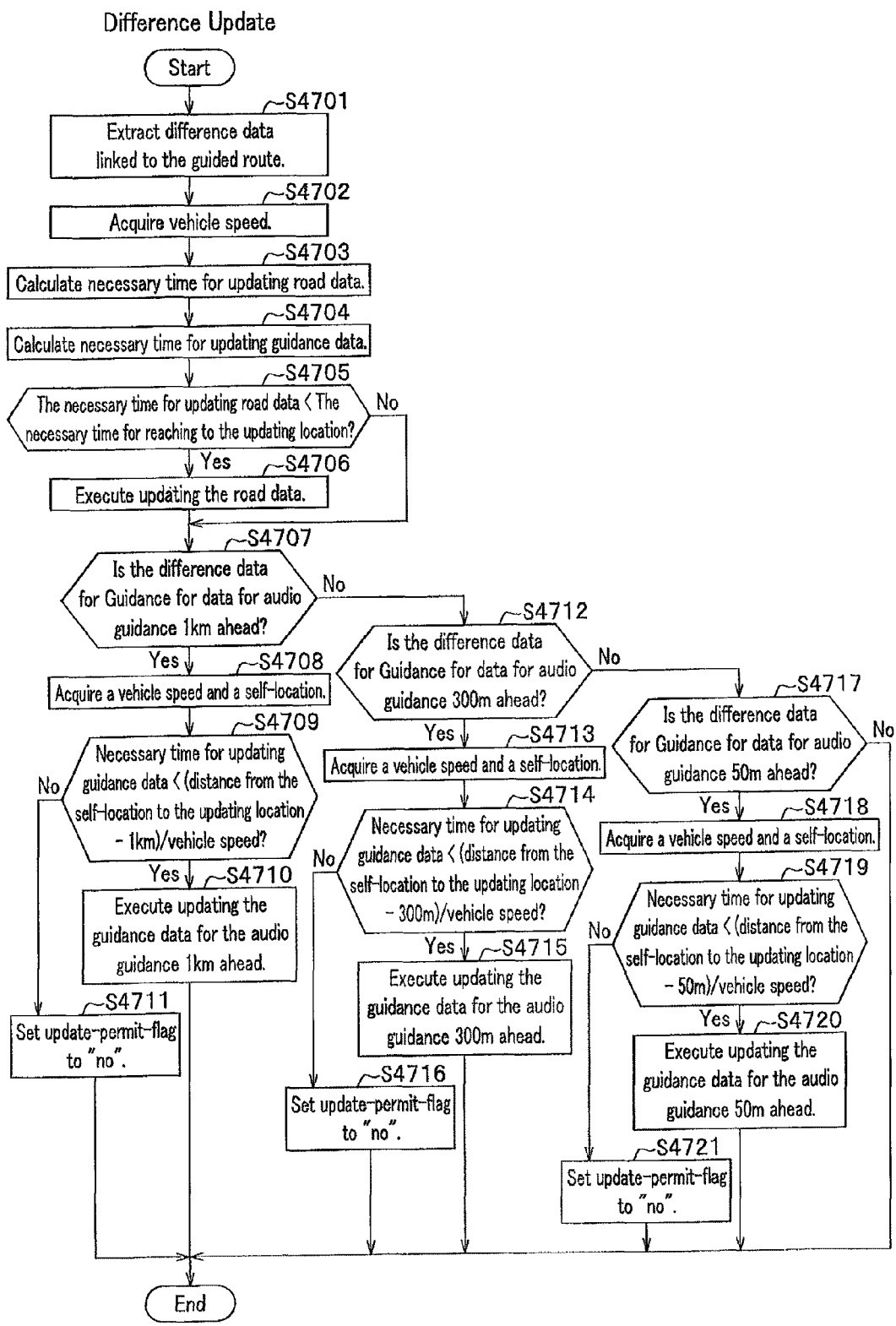
FIG. 13 shows a processing flow example of difference update in the map update in the car navigation system.

FIG. 13 shows a processing flow example of difference update in the map update in the car navigation system 1.

The CPU of the car navigation system 1 first extracts difference data linked to the node data of a guided route that is currently in use for the guidance, from the difference data of an updating objet (step S4701). In other words, by extracting the difference data linked to the node data of a guided route, the CPU prepares to execute judgment for updating guided route data. Next, the CPU acquires vehicle speed via a vehicle speed acquisition unit 112 (step S4702). For acquiring a vehicle speed, for example, the CPU measures a vehicle speed every one second for 10 seconds, which means 10 samples are obtained, and then takes the mean value of the 10 samples.

Next, the CPU calculates a time necessary for updating road data (step S4703), and calculates a time necessary for updating guidance data (step S4704). In this case, the time for updating road data is calculated based on the size of difference data for road data or guidance data, and processing times necessary for instructions of map data operations (add, delete, update etc.) in handling unit data size. For reference, processing times for add, delete, and update in handling unit data size are about 0.1 ms/byte, 0.5 ms/byte, and 0.2 ms/byte respectively.

When executing a difference update process with communications and receiving distribution of difference data in parallel, the transmission time for the communications and broadcasting need to be considered. In this case, the transmission time is calculated by "difference data size"×"transmission rate".

Next, the CPU compares the necessary time for updating road data with the necessary time for reaching to the updating location. When the necessary time for updating road data is smaller than the necessary time for reaching to the updating location ("Yes", in step S4705), the CPU executes the difference update of the road data. When the necessary time for updating road data is not smaller than the necessary time for reaching to the updating location ("No", in step S4705), the CPU does not execute the difference update of the road data.

If the difference data for Guidance corresponds to an audio guidance on an intersection 1 km ahead of the self-location ("Yes", in step S4707), the CPU acquires a vehicle speed and a self-location (S4708). Further, the CPU determines if the necessary time for updating guidance data is smaller than the time value for a distance divided by the vehicle speed, the distance left after subtracting 1 km from a distance between the self-location and the updating location. If it is smaller ("Yes", in step S4709), the CPU executes updating the guidance data for the audio guidance on an intersection 1 km ahead of the self-location (step S4710).

If the necessary time for updating guidance data is not smaller than the time value for a distance divided by the vehicle speed, the distance left after subtracting 1 km from a distance between the self-location and the updating location ("No", in step S4709), the CPU determines that there is not enough time for updating the guidance data for the audio guidance 1 km ahead, and sets the update-permit-flag to "no" on management information in an HDD map 110 (step S4711). The management information in the HDD map 110 will be explained later in detail referring to FIG. 17.

If the difference data for Guidance does not correspond to audio guidance 1 km ahead of the self-location ("No", in step S4707), and when the difference data for Guidance corresponds to audio guidance 300 m ahead of the self-location ("Yes", in step 4712), the CPU acquire a vehicle speed and a self-location (step S4713). Further, when the necessary time for updating guidance data is smaller than the time value for a distance divided by the vehicle speed, the distance left after subtracting 300 m from a distance between the self-location and the updating location ("Yes", in step S4714), the CPU executes updating the guidance data for the audio guidance 300 m ahead of the self-location (step S4715).

If the necessary time for updating guidance data is not smaller than the time value for a distance divided by the vehicle speed, the distance left after subtracting 300 m from a distance between the self-location and the updating location ("No", in step S4714), the CPU judges that there is not enough time for updating the guidance data for the audio guidance 300 m ahead, and sets the update-permit-flag to "no" on management information in HDD map 110 (step S4716).

If the difference data for Guidance is not for data for audio guidance 300 m ahead of the self-location, and if it is data for audio guidance 50 m ahead ("Yes", in step S4717), the CPU acquires a vehicle speed and a self-location (step S4718). Further, the CPU determines whether or not the necessary time for updating guidance data is smaller than the time value for a distance divided by the vehicle speed, the distance left after subtracting 50 m from a distance between the self-location and the updating location. If it is smaller ("Yes", in step S4719), the CPU executes updating the guidance data for the audio guidance 50 m ahead (step S4720).

If the necessary time for updating guidance data is not smaller than the time value for a distance divided by the vehicle speed, the distance left after subtracting 50 m from a distance between the self-location and the updating location ("No", in the step S4719), the CPU determines that there is not enough time for updating the guidance data for the audio guidance 50 m ahead, and sets the update-permit-flag to "no" on management information in HDD map 110 (step S4721).

As stated above, in the guidance processes from steps S4707 to S4721, which require quick response in real time, the CPU executes updating the guidance data putting the priority on the smaller updating time. In addition, if the CPU cannot update the difference data, the update-permit-flag is set thereunder, and the CPU can perform the guidance correction (see step S59 in FIG. 10) without retrieving again the map data in the HDD map 110.

Figure 14:
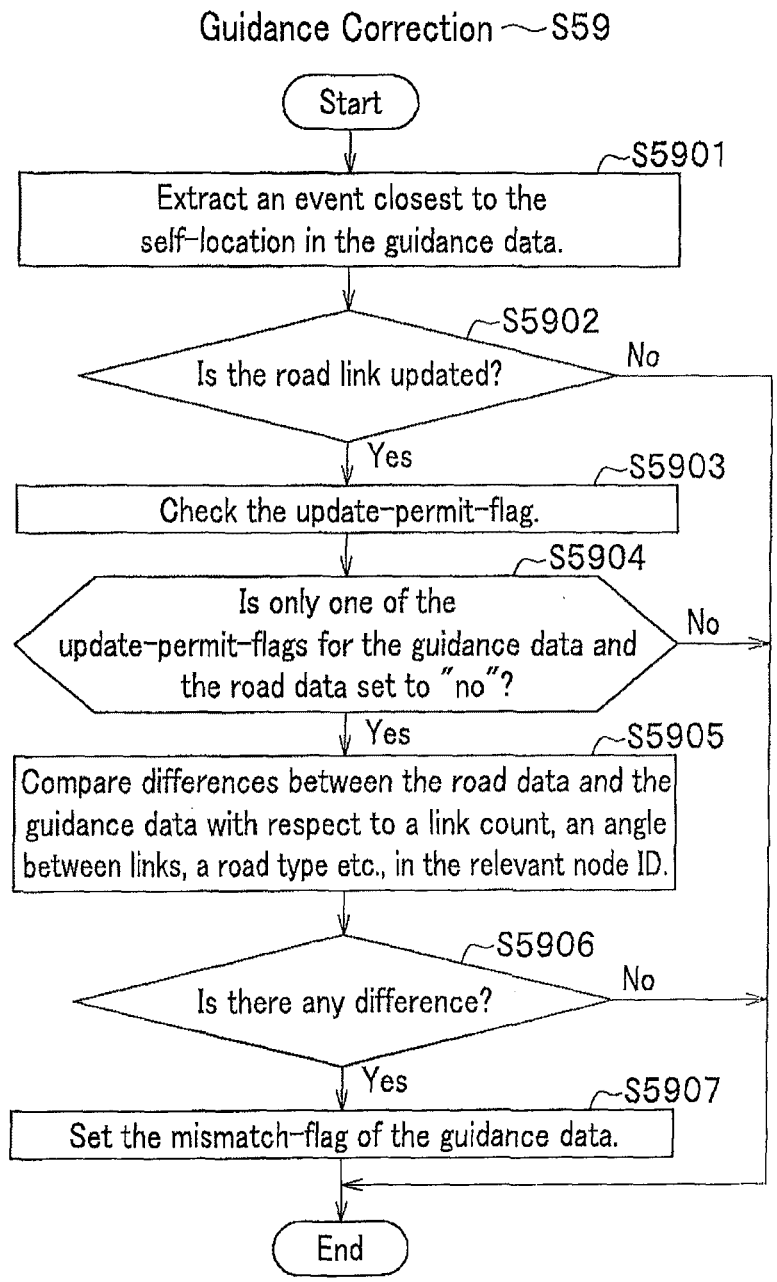
FIG. 14 shows a processing flow example of a guidance correction in the route guidance in the car navigation system.

FIG. 14 shows a processing flow example of a guidance correction in the route guidance in the car navigation system 1. The guidance correction is a process for correcting guidance if there is inconsistency between the map data and the guidance data.

The CPU in the car navigation system 1 first extracts an event closest to the self-location in the guidance data step S5901). Next, the CPU checks whether or not a road link is updated, and if the road link is updated ("Yes", in step S5902), then the CPU checks the update-permit-flag in the management information on the HDD map 110 (step S5903).

If only one of the update-permit-flags for the guidance data and the road data is set to "no" ("Yes", in step S5904), the CPU checks differences between the road data and the guidance data with respect to a link count, an angle between links, a road type etc., in the relevant node ID (step S5905). Herewith, if only one of the flag being "no", permissible differences between the road data and the guidance data are judged on a priority basis, and therefore the CPU can execute the judgments (the comparison in step S5905) without retrieving again the map data on the HDD map 110.

If any difference is found in the comparison process above ("Yes", in step S5906), the CPU sets the mismatch-flag of the guidance data (step S5907). Herewith the CPU can immediately execute a notification to a user that requires quick response in real time (see step S60 in FIG. 10), without retrieving again the map data in the HDD map 110.

If the road link is not updated ("No", in step S5902), and if both of the update-permit-flags for the guidance data and the road data are set to "yes" or both are set to "no" ("No", in step S5904), and if there is no difference in the comparison process ("No", in step S5906), the CPU will not execute guidance correction.

FIG. 15 shows a structure example of a navigation application consistency management table 103. As shown in FIG. 15, the navigation application consistency management table 103 includes data of: Application Name, Parcel count, Parcel ID List, and Update Completion Flag.

Here, the application name is a name of a navigation application executed on the car navigation system 1, the parcel count is a parcel count necessary for the normal execution of the navigation applications, and the parcel ID List is a list of parcel IDs necessary for the normal execution of the navigation applications. As described before, map data specified by a parcel in the parcel ID list is cached on the cached map 109. As stated before, updating and referring to the navigation application consistency management table 103 are performed by the cached map update unit 107 and the cached map area specifying unit 108.

The update completion flag indicates whether or not updating map data of all parcels (DB files) specified by the parcel ID list is completed. In other words, if an update completion flag corresponding to certain navigation application is "completed", the operation of the navigation application is guaranteed. On the other hand, if the update completion flag is "not completed", it is required to execute the navigation application using map data of a parcel before updating.

The parcel ID list in the navigation application consistency management table 103 is updated as appropriate when the self-location is moved. Here, the parcel count of the route guidance application is a number of parcels that include the guided route and the vicinity, and is also updated appropriately when a guided route is searched or the self-location is moved.

The navigation application consistency management table 103 makes it possible to detect the completion of update of parcels (DB files), for each navigation application, which include map data necessary for normal operation of the navigation application. So, each navigation application can detect the completion of update for map data necessary to the application and start using the map data at that time, without waiting for the completion of updating entire map data. In other words, the updated map becomes available quickly to the user of the car navigation system 1.

In the explanation for FIG. 15 above, parcel count may be referred to as DB file count, and parcel ID list may be referred to as name list of DB files.

Figures 16, 17:
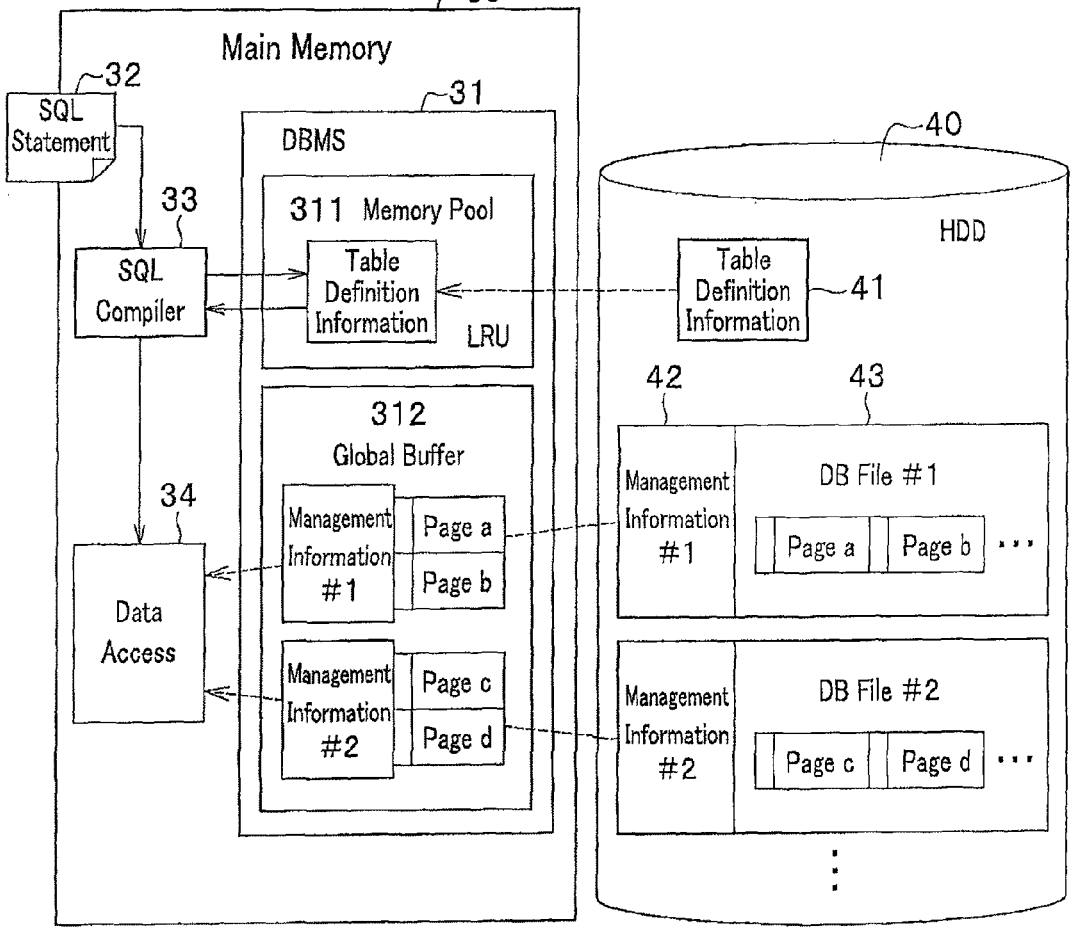
FIG. 16 is an explanatory diagram for explaining operation of a Relational Database (RDB) between the main memory and an HDD in the car navigation system.
FIG. 17 shows a structure example of management information in the map database in the car navigation system.

FIG. 16 is an explanatory diagram for explaining operation of a Relational Database (RDB) between the main memory and an HDD in the car navigation system 1.

As shown in FIG. 16, the HDD 40 includes table names in map database managed by RDB, and table definition information 41 for defining column name and type definition of columns in the table. The table definition information 41 is loaded on a memory pool 311 in a Database Management System 31 (DBMS) that is loaded on the main memory 30 during the initialization of RDB after power on.

The DBMS 31, upon receiving a map access request from a navigation application via a function call, generates SQL statements 32 according to the function call. An SQL compiler 33 compiles the SQL statement 32 using the table definition information, which is already loaded, on the memory pool 311.

A data access 34 determines physical locations for map data in the map database according to the compile result of the SQL statement 32, and identifies a page, which is a management unit of the map data, and identifies page management information, and then stores them into a global buffer 312 on the main memory.

As stated above, since the management information 42 and pages are loaded on the main memory, the CPU can access the map data on the main memory during the execution of the navigation application, and can do without overhead like accessing via the RDB or accessing to the HDD 40.

FIG. 17 shows a structure example of management information in the map database in the car navigation system 1. As shown in FIG. 17, the management information 42 includes Page Size, Page Count, Page Number List, Parcel ID, Data Type, Guidance Data, Update-permit-flag, Mismatch-flag and the like.

Here, the page size represents data size of a page, the page count represents a page count necessary for holding the map data, the page number list represents page numbers (page address) that hold the map data, the parcel ID represents a parcel ID specifying a parcel to which the map data resides, and the data type represents a type of the map data (road data, guidance data, background data etc.).

The update-permit-flag represents whether or not difference update is completed, and is set by the difference update (see FIG. 13). The mismatch-flag represents whether or not road data and guidance data match to each other, and is set by the guidance correction (see FIG. 14).

FIGS. 18A to 18B and FIGS. 19C to 19F show a first example representing a condition in which map data on the HDD is updated with map data on a map media.

FIG. 18A shows a status before starting map update. A symbol 61 is a map of Lv5-6, and a symbol 62 is a map of Lv1-4, a symbol 63 is a self-location vicinity map, and a symbol 64 represents a self-location.

When the DB file update is executed (see FIG. 11), first as shown in FIG. 18B, old Lv5-6 maps 61 and old Lv1-4 maps 62 excluding a self-location vicinity map 63 are deleted. Here, the self-location vicinity map 63 is cached on the cached map 103 (see FIG. 1).

Next, as shown in FIG. 19C, Lv5-6 maps and Lv1-4 maps excluding the self-location vicinity map 63 are copied from the map media 5 to the HDD without changing the names. The self-location vicinity map 63 is copied to the cached map 103 after renaming a new file.

Next, as shown in FIG. 19D, when copying is completed, then as shown in FIG. 19E, the old self-location vicinity map 63 is deleted, and then newly renamed and copied self-location vicinity map 63 is renamed again to the same name as the old self-location vicinity map 63. As stated above, in FIG. 19F, updating the map data is completed.

FIGS. 20A to 20C and FIGS. 21D to 21G show a second example representing a condition in which map data on the HDD is updated with map data on a map media.

FIG. 20A shows a status before starting map update. A symbol 71 is a map of Lv5-6, and a symbol 72 is a map of Lv1-4, a symbol 73 is a self-location vicinity map, and a symbol 74 represents a self-location.

Next, when the DB file update is executed (see FIG. 11), as shown in FIG. 20B, a guided route 75 is identified, and then a guided route vicinity map 77 is identified. Further, as shown in FIG. 20C, old Lv5-6 maps and old Lv1-4 maps excluding the guided route vicinity map 77 are deleted.

Next, as shown in FIG. 21D, Lv5-6 maps 71 and Lv1-4 maps 72 excluding the guided route vicinity map 77 are copied from the map media 5 to the HDD without changing the names. The guided route vicinity map 77 is copied into the cached map 103 after renaming a new file.

Next, as shown in FIG. 21E, when copying is completed, then as shown in FIG. 21F, the old guided route vicinity map 77 is deleted, and newly renamed and copied guided route vicinity map 77 is renamed again to the same name as the old guided route vicinity map 77. As a result, in FIG. 21G, updating the map data is completed.

What is claimed is:

1. A car navigation system comprising: a central processing unit; map data storing means for storing map data of a plurality of areas into respective map data files; display means for displaying the map data; location acquisition means for acquiring a self-location; and destination determination means for determining a destination;

the car navigation system searching a guided route from the self-location to the destination by referring to the map data storing means, and displays the guided route on the display means, the central processing unit executing processes for:

identifying a map data file that includes the destination, the guided route and its vicinity, necessary for executing an application program, per each application program in the car navigation system, from a plurality of map data files stored in the map data storing means;

monitoring an update status of the identified map data file when updating map data files stored on the map data storing means;

preparing information in which the update status of the map data file obtained by the above monitoring process and identification data of the map data file are associated with the application program, and storing the information into a storage device as management information for managing the operation consistency of the application program; and in a case of updating map data files of which identification data is included in the management information, updating the map data file with reference to the execution status of the application program, and in a case of updating map data files of which identification data is not included in the management information, updating the map data file without reference to the execution status of the application program;

wherein the central processing unit, in a case of executing an application program for guidance, refers to the management information and judges whether or not updating a map data file associated to the application program is completed, and when the update is completed, retries a route search using the updated map data file; and wherein, when the central processing unit judges that the updating of the map data file associated with the application program is not completed, the central processing unit determines whether road data is consistent with guidance data by comparing the road data to the guidance data for the guided route, and when the road data and the guidance data are inconsistent a notification of possible mismatches between the guided route and an actual route is provided to a user of the car navigation system.

2. The car navigation system according to claim 1, wherein the central processing unit:

compares the new guided route obtained by retrying the route search and an old guided route obtained before updating the map data file, and in a case of the new guided route being judged to be faster to a destination, then displays the new guided route on the display means.

3. The car navigation system according to claim 1, wherein:

the central processing unit, when updating map data linked to the guided route, calculates a time for reaching to a location included in the map data to be updated, and a time for updating the map data, and in a case of the time for updating the map data being shorter than the time for reaching to the location included in the map data to be updated, then executes updating the map data.

4. The car navigation system according to claim 1, wherein:

the central processing unit first updates a map data file of which identification data is stored in the management information, out of the plurality of map data files, before updating other map data files stored in the map data storing means.

5. A computer readable medium storing a program code for a car navigation system comprising: a central processing unit; map data storing means for storing map data of a plurality of areas into respective map data files; display means for displaying the map data; location acquisition means for acquiring a self-location; and destination determination means for determining a destination;

the car navigation system searching a guided route from the self-location to the destination by referring to the map data storing means, and displays the guided route on the display means, the central processing unit executing processes for:

identifying a map data file that includes the destination, a guided route and its vicinity, necessary for executing an application program, per each application program in the car navigation system, from a plurality of map data files stored in the map data storing means;

monitoring an update status of the identified map data file when updating map data files stored on the map data storing means;

preparing information in which the update status of the map data file obtained by the above monitoring process and identification data of the map data file are associated with the application program, and storing the information into a storage device as management information for managing the operation consistency of the application program; and in a case of updating map data files of which identification data is included in the management information, updating the map data file with reference to the execution status of the application program, and in a case of updating map data files of which identification data is not included in the management information, updating the map data file without reference to the execution status of the application program;

wherein the central processing unit refers to the management information and judges whether or not updating a map data file associated to the application program is completed, and when the update is completed, retries a route search using the updated map data file; and wherein, when the central processing unit judges that the updating of the map data file associated with the application program is not completed, the central processing unit determines whether road data is consistent with guidance data by comparing the road data to the guidance data for the guided route, and when the road data and the guidance data are inconsistent a notification of possible mismatches between the guided route and an actual route is provided to a user of the car navigation system.

6. The computer readable medium storing a program code for a car navigation system according to claim 5, wherein the central processing unit:

compares the new guided route obtained by retrying the route search and an old guided route obtained before updating the map data file, and in a case of the new guided route being judged to be faster to a destination, then displays the new guided route on the display means.

7. The computer readable medium storing a program code for a car navigation system according to claim 5, wherein:

the central processing unit, when updating map data linked to the guided route, calculates a time for reaching to a location included in the map data to be updated, and a time for updating the map data, and in a case of the time for updating the map data being shorter than the time for reaching to the location included in the map data to be updated, then executes updating the map data.

8. The computer readable medium storing a program code for a car navigation system according to claim 5, wherein:

the central processing unit first updates a map data file of which identification data is stored in the management information, out of the plurality of map data files, before updating other map data files stored in the map data storing means.

9. A method for updating map data in a car navigation system comprising: a central processing unit; map data storing means for storing map data of a plurality of areas into respective map data files; display means for displaying the map data; location acquisition means for acquiring a self-location; and destination determination means for determining a destination;

the car navigation system searching a guided route from the self-location to the destination by referring to the map data storing means, and displays the guided route on the display means, the central processing unit executing processes for:

identifying a map data file that includes the destination, a guided route and its vicinity, necessary for executing an application program, per each application program in the car navigation system, from a plurality of map data files stored in the map data storing means;

monitoring an update status of the identified map data file when updating map data files stored on the map data storing means;

preparing information in which the update status of the map data file obtained by the above monitoring process and identification data of the map data file are associated with the application program, and storing the information into a storage device as management information for managing the operation consistency of the application program; and in a case of updating map data files of which identification data is included in the management information, updating the map data file with reference to the execution status of the application program, and in a case of updating map data files of which identification data is not included in the management information, updating the map data file without reference to the execution status of the application program;

wherein the central processing unit judges whether or not updating a map data file associated to the application program is completed and, when the central processing unit judges that the updating of the map data file associated with the application program is not completed, the central processing unit determines whether road data is consistent with guidance data by comparing the road data to the guidance data for the guided route, and when the road data and the guidance data are inconsistent a notification of possible mismatches between the guided route and an actual route is provided to a user of the car navigation system.

10. The method for updating map data according to claim 9, wherein:

the central processing unit, when updating map data linked to the guided route, calculates a time for reaching to a location included in the map data to be updated, and a time for updating the map data, and in a case of the time for updating the map data being shorter than the time for reaching to the location included in the map data to be updated, then executes updating the map data.

11. The method for updating map data according to claim 9, wherein:

the central processing unit first updates a map data file of which identification data is stored in the management information, out of the plurality of map data files, before updating other map data files stored in the map data storing means.

* * * * *